US011244032B1

(12) United States Patent
Nguyen

(10) Patent No.: US 11,244,032 B1
(45) Date of Patent: Feb. 8, 2022

(54) SYSTEM AND METHOD FOR THE CREATION AND THE EXCHANGE OF A COPYRIGHT FOR EACH AI-GENERATED MULTIMEDIA VIA A BLOCKCHAIN

(71) Applicant: Oraichain Pte. Ltd.

(72) Inventor: Diep Thi Ngoc Nguyen, Hanoi (VN)

(73) Assignee: Oraichain Pte. Ltd., Singapore (SG)

( * ) Notice: Subject to any disclaimer, the term of this patent is extended or adjusted under 35 U.S.C. 154(b) by 0 days.

(21) Appl. No.: 17/211,569

(22) Filed: Mar. 24, 2021

(51) Int. Cl.
*H04L 29/06* (2006.01)
*G06F 21/10* (2013.01)
*G06F 9/54* (2006.01)
*H04L 9/06* (2006.01)

(52) U.S. Cl.
CPC ............ *G06F 21/105* (2013.01); *G06F 9/547* (2013.01); *H04L 9/0618* (2013.01); *H04L 2209/38* (2013.01)

(58) Field of Classification Search
CPC ..... G06F 21/105; G06F 9/547; H04L 9/0618; H04L 2209/38
See application file for complete search history.

(56) References Cited

U.S. PATENT DOCUMENTS

| | | | | |
|---|---|---|---|---|
| 7,640,209 B1* | 12/2009 | Brooks | ................. | G06Q 40/025 |
| | | | | 705/38 |
| 2008/0281768 A1* | 11/2008 | Sadeh | .................... | G06Q 10/10 |
| | | | | 706/47 |
| 2012/0303490 A1* | 11/2012 | Hill | ......................... | G06F 21/10 |
| | | | | 705/27.2 |
| 2013/0311356 A1* | 11/2013 | Ho | ........................ | G06Q 20/123 |
| | | | | 705/39 |
| 2014/0164507 A1* | 6/2014 | Tesch | ...................... | H04L 51/10 |
| | | | | 709/204 |
| 2017/0213156 A1* | 7/2017 | Hammond | .............. | G06F 9/451 |

(Continued)

FOREIGN PATENT DOCUMENTS

| | | | |
|---|---|---|---|
| CN | 107659610 | * | 2/2018 |
| CN | 110135803 | * | 8/2019 |

(Continued)

OTHER PUBLICATIONS

Liu et al. A Blockchain-based Platform Architecture for Multimedia Data Management, Sep. 2020, arXiv.org, p. 1-18 (Year: 2020).*

*Primary Examiner* — Taghi T Arani
*Assistant Examiner* — Lin Chang
(74) *Attorney, Agent, or Firm* — Gearhart Law LLC; David Postolski

(57) ABSTRACT

A method for creating and exchanging a copyright for each artificial intelligence (AI)-generated multimedia is described. An AI model and a reference input for a multimedia is received from a user. If the reference input complies with system policies, an AI-generated multimedia is generated from the reference input using the AI model. The AI-generated multimedia is compared against works of a same type in a blockchain and decentralized file storage and if the AI-generated multimedia fails to match the works, the AI-generated multimedia is categorized as having originality. A copyright for the AI-generated multimedia and the AI-generated multimedia is stored. An exchange is facilitated with a buyer using cryptocurrency and is written to a blockchain.

20 Claims, 13 Drawing Sheets

(56) References Cited

U.S. PATENT DOCUMENTS

| | | | |
|---|---|---|---|
| 2018/0068091 A1* | 3/2018 | Gaidar | G06F 21/16 |
| 2018/0181730 A1* | 6/2018 | Lyske | G06F 21/6209 |
| 2018/0365396 A1* | 12/2018 | Rucker | G06F 21/645 |
| 2019/0042488 A1* | 2/2019 | Guim Bernat | G06F 9/505 |
| 2019/0347290 A1* | 11/2019 | Yang | G10H 1/0058 |
| 2020/0111096 A1* | 4/2020 | Liu | H04L 65/605 |
| 2020/0168194 A1* | 5/2020 | Silverstein | G10H 1/0025 |
| 2020/0193064 A1* | 6/2020 | Liu | G06N 3/0454 |
| 2020/0273048 A1* | 8/2020 | Andon | G06F 16/2379 |
| 2020/0364196 A1* | 11/2020 | Frost | G06F 16/483 |
| 2021/0049569 A1* | 2/2021 | Park | G06Q 20/02 |

FOREIGN PATENT DOCUMENTS

| | | | |
|---|---|---|---|
| CN | 111538963 | * | 8/2020 |
| KR | 101983529 | * | 5/2019 |

* cited by examiner

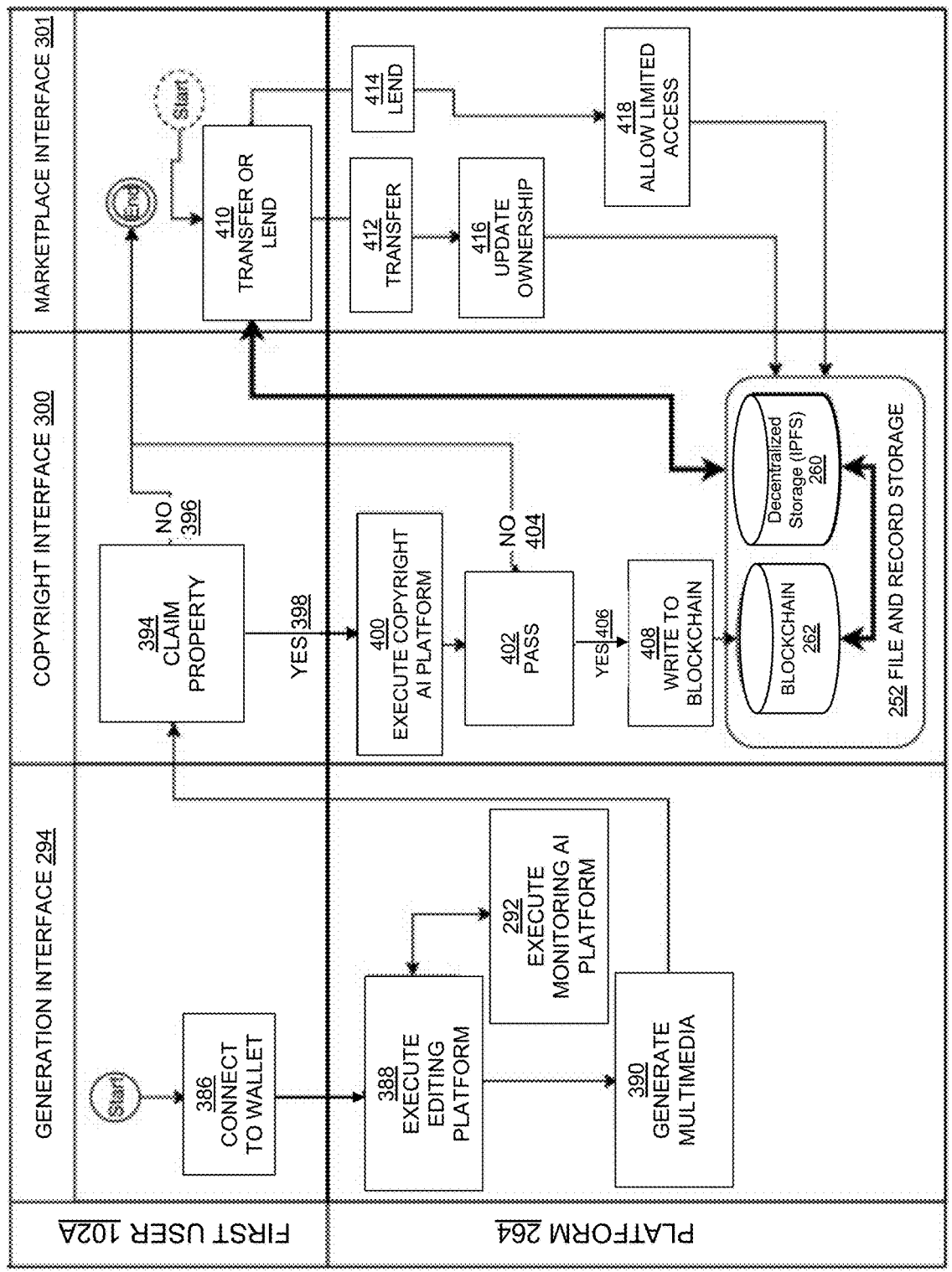

SYSTEM AND METHOD FOR THE CREATION AND THE EXCHANGE OF A COPYRIGHT FOR EACH AI-GENERATED MULTIMEDIA VIA A BLOCKCHAIN

FIELD OF THE EMBODIMENTS

The field of the invention and its embodiments relate to a system and a method for the creation and the exchange of a copyright for each AI-generated multimedia via a blockchain.

BACKGROUND OF THE EMBODIMENTS

Artificial intelligence (AI) systems can generate many kinds of digital multimedia, including text (such as stories or poems), graphics (such as pictures, photographs, icons, faces, etc.), animations (such as two-dimensional or three-dimensional motion graphics), video (such as movies or clips) and sound (such as music, noises, ring bells, etc.) as if they were generated by humans, with little or without human intervention. Without differentiating in the "creativity" as works created by humans, these AI-generated multimedia are worth considering for some kinds of copyright protection.

Blockchain technology is an innovative technology for organizing data in a secured manner. More specifically, a blockchain is a distributed ledger that can record transactions between two computer systems efficiently and in a verifiable and permanent way. A typical blockchain is a growing list of records, referred to as blocks, that are linked using cryptography. A blockchain database is typically managed autonomously using a peer-to-peer network and a distributed timestamping server. In many decentralized blockchains, every node in the decentralized system has a copy of the blockchain. Transactions are broadcast over the computer network and data quality is maintained by database replication and computational trust.

Many blockchains are publicly accessible and are referred to as permissionless. In a permissionless blockchain, any computing system can choose to run a node for the blockchain and participate in transaction verifications via a mining mechanism, as well as create smart contracts on the network. In these frameworks, network participants are rewarded for their contributions through issuance of cryptographic tokens or cryptocurrency.

On the other hand, a permissioned blockchain is a closed computing system in which each participant is well-defined. This type of blockchain is built to allow an organization or a consortium of organizations to efficiently exchange information and record transactions. In a permissioned blockchain, only pre-approved entities can run the nodes that validate transaction blocks and execute smart contracts on the blockchain.

In both permissioned and permissionless blockchains, a smart contract or software programs may run on the blockchain. A smart contract enforces a set of rules using cryptographic code. Smart contracts are usually developed as high-level programming abstractions that can be compiled down to bytecode, which can be deployed to a blockchain for execution by computer systems using a virtual machine deployed in conjunction with the blockchain. Once a smart contract is called within a blockchain, the code of the smart contract acts as a programmatically defined autonomous agent with its own persistent variables that executes by computer systems within the blockchain when the smart contract is referenced by a message and/or transaction. The output of the smart contract (such as updated wallet balance, update of information, etc.) is then written to blockchain for permanent recording.

As such, blockchains are a natural choice for copyright management of AI-generated multimedia. An AI process that is to generate multimedia can be coded into a smart contract and the copyright can be recorded in the blockchain. The generated multimedia become cryptographic tokens that the ownership is associated with them as copyrights. Cryptographic tokens or non-fungible tokens (NFTs) are created with respect to the AI-generated multimedia and may be used to transfer the AI-generated multimedia via smart contracts. If the two processes, the creation of multimedia and the recording of associated copyright, are integrated within a blockchain system, it helps securely verify the origin of the multimedia, which supports the evidence of copyright issuance and make it possible to exchange the copyright in a trusted manner. Once separated, there will appear numerous limitations.

First of all, once the creation happens outside of the blockchain system (i.e., not via the specific smart contract of the blockchain, or not via a compatible smart contract to the blockchain), there can't be any record to verify its origin (who and when and how). If the origin of the multimedia can't be justified, its associated copyright is meaningless. Conventional NFT systems are limited by this origin verification.

Secondly, when a digital multimedia is generated, it is not only the one who uses the tool to create it, but it's necessary to recognize the contribution of the programmer who created the tool, the provider who made the tool available. All involved people should be considered to be related to the creation and should be able to receive royalties from any profit of the exchanging of the multimedia may arise.

Furthermore, from a technical viewpoint, blockchain enterprise applications are difficult to implement since they require knowledge of cryptography, peer-to-peer systems, and specialized languages used in blockchain smart contracts. Other technical issues associated with blockchains include interfacing an application on the blockchain to already existing technologies, such as reporting services and databases.

Thus, a need exists for a method in which the blockchain is equipped with the functionalities from AI to be able to become both a validator and an executor of the data that it will preserve. Moreover, a need exists for a system and a method for the creation and the exchange of a copyright for each AI-generated multimedia via a blockchain.

Review of Related Technology:

KR1020200012321A describes a blockchain-based intellectual property rights management system that can build an ecosystem of intellectual property rights to induce a desirable registration and transaction of copyrights, publicity rights, and industrial property rights consisting of patents, utility models, trademarks, and designs. When events related to intellectual property rights registration, intellectual property rights transaction, digital virtual currency deposit, intellectual property rights contract, and intellectual property rights payment are generated, blocks are created from the events to transfer the information events to a plurality of blockchain-based user terminals and a blockchain-based service company server. At least one operation for generating a blockchain by connecting the blocks to the previous blocks is executed.

US20200160465A1 describes a comprehensive platform (the "IPwe Platform") that utilizes blockchain and smart contracts to address and improve upon the significant deficiencies that currently exist in the global intellectual property market (patents, trademarks, copyrights, etc.). The objective of the IPwe Platform is creating transparency in (i) patent ownership, (ii) patent identification and (iii) patent coverage and value. In addition, by providing the network, a guaranteed buy program can be initiated that provides specific guaranteed value to intellectual property assets listed by verified brokers.

US20200111186A1 describes a system configured to manage and track intellectual property (IP). Some embodiments of this system may include: an application programming interface (API) having access to a web-accessible IP database; an artificial intelligence (AI) or learning engine coupled to the API and operating the API to query the web-accessible IP database for orphaned IP assets that have become abandoned, expired, and/or public domain assets; and a user-collaboration platform. Some embodiments of this platform may: receive information from the API concerning the orphaned IP assets found by the API; store the information concerning each of the orphaned IP assets on a blockchain data structure; provide access to the orphaned IP assets stored on the blockchain data structure to users via a network; and record user activity concerning user access, development, sharing, and/or modification of the orphaned IP assets on the blockchain data structure.

U.S. Ser. No. 10/592,639B2 describes use of blockchain-based shadow images to facilitate copyright protection of digital content. Specifically, this reference describes a client platform that supports digital rights management. The client platform comprises a digital rights management (DRM) engine which, when executed, enables the client platform to monitor download operations performed by the client platform and to obtain a shadow image for a digital content item from a DRM blockchain, in response to an operation to download the digital content item from a remote source. The shadow image comprises a hash of the digital content item and copyright policy settings to indicate security constraints for the digital content item. The client platform may automatically determine whether the copyright policy settings for the digital content item allow modification of the digital content item.

US20210044439A1 describes a method and system of storing a record of a copyright event in a blockchain through an agent. Devices of some work service providers operating work-related services can serve as member nodes to form a consortium blockchain network. Each work service provider broadcasts copyright events generated based on its work-related services to the consortium blockchain network, so all the work service providers perform blockchain-based distributed storage. In addition, the plurality of member nodes include at least one agenting member node, where each agenting member node has a right to agent copyright event record storage for a non-member node corresponding to the agenting member node.

EP3780544A1 describes a method and system of storing a record of a copyright event based on a blockchain. Devices of some work service providers operating work-related services can serve as member nodes to form a consortium blockchain network. Each work service provider broadcasts copyright events generated based on its work-related services to the consortium blockchain network, so all the work service providers perform blockchain-based distributed storage.

CN107659610B describes a copyright protection method, device, and system based on blockchain technology. The method comprises: obtaining copyright information of works; packaging and writing the copyright information in a blockchain; issuing the blockchain to a network; receiving an authorization request sent by a requester; extracting corresponding copyright information from the blockchain according to the authorization request; forming authorization information based on the copyright information; feeding back the authorization information to the requester; packaging and writing the authorization information in the blockchain; and issuing the blockchain to the network.

US20200372834A1 describes methods and systems for hiding copyright information in printable materials. One of the methods includes: generating, by a computing device, a unique identifier (ID) based on copyright information associated with digital content, where the copyright information and the digital content are recorded on a blockchain of a blockchain network; determining one or more features associated with one or more printable materials; converting the unique ID to a digital watermark based on the one or more features, where the digital watermark is not apparent to an unaided human eye when printed on the one or more printable materials; and enabling retrieval of the copyright information from the blockchain based on the unique ID.

Various similar systems exist. However, their means of operation are substantially different from the present disclosure, as the other inventions fail to solve all the problems taught by the present disclosure.

SUMMARY OF THE EMBODIMENTS

The present invention and its embodiments relate to a system and a method for the creation and the exchange of a copyright for each AI-generated multimedia via a blockchain.

A first embodiment of the instant invention describes a system configured to execute a method for creating and exchanging a copyright for each artificial intelligence (AI)-generated multimedia. The system includes, at least, a multimedia generation module, a copyright claiming module, and an asset exchanging module. The multimedia generation module is configured to: receive a user selection of an AI model for a multimedia and receive a reference input for the multimedia from the user. In response to a determination that the reference input complies with system policies (e.g., rules associated with restricted content, child endangerment, inappropriate content, sexual content, profanity, hate speech, violence, terrorist, bullying, harassment, and/or dangerous products), the multimedia generation module is configured to: generate an AI-generated multimedia from the reference input using the AI model. The determination that the reference input complies with the system policies occurs automatically using the AI model and/or using human intervention. In some examples, the multimedia generation module also comprises a legal component configured to compute a legal correctness for the reference input according to regulations and copyright laws.

Next, the copyright claiming module is configured to: receive an indication from the user that the user wants to claim a copyright in the AI-generated multimedia. Then, the copyright claiming module is configured to: verify the originality of the AI-generated multimedia by comparing the AI-generated multimedia against works of a same type that already exist in the blockchain. In response to a determination that the AI-generated multimedia fails to match the works of the same type in the storage, the copyright claiming module is configured to: identify the AI-generated multimedia as having originality. Moreover, the copyright claiming module is configured to: set the copyright to associate with the AI-generated multimedia and store the information into the blockchain and store the AI-generated multimedia in a decentralized file storage. In other examples, the copyright claiming module is further configured to: utilize the information which are stored in the file and blockchain storage to verify the originality of the AI-generated multimedia; and allow the user to edit some accessory information related to the AI-generated multimedia and write those information to the blockchain (for examples: a title of the multimedia, a private message, an unique identification number).

In other examples, in response to a determination that the AI-generated multimedia matches the works of the same type in the storage, the copyright claiming module is configured to identify the AI-generated multimedia as lacking the originality. Then, the claiming module is further configured to: receive a notification from the user that the user wishes to wait for a future update of a verification policy by queueing the AI-generated multimedia; and store a pending copyright for the AI-generated multimedia in the storage.

The asset exchanging module is configured to: receive a request from a buyer to use the copyright for the AI-generated multimedia, prompt the user to exchange the copyright for the AI-generated multimedia with the buyer for cryptocurrency, facilitate the exchange between the user and the buyer, and write the exchange to the blockchain. In examples, the cryptocurrency may be non-fungible tokens (NFTs) or cryptographic tokens. The exchange of the copyright includes the permission to use with limited approval (such as display only, replaying in a number of times, etc.), or permission to adapt, or totally transferring of the copyright.

A second embodiment of the present invention describes a method. The method is executed by a system for method for creating and exchanging a copyright for each artificial intelligence (AI)-generated multimedia. The method includes numerous process steps, such as: receiving, via a multimedia generation module of the system, a user selection of an AI model for a multimedia; receiving, via the multimedia generation module, a reference input for the multimedia from the user; and in response to a determination that the reference input complies with system policies, generating, via the multimedia generation module, an AI-generated multimedia from the reference input using the AI model. Determining if the reference input complies with system policies occurs automatically using the AI model and/or using human intervention.

The method also includes: receiving, via a copyright claiming module of the system, a notification from the user that the user wants to claim a copyright in the AI-generated multimedia; comparing, via the copyright claiming module, the AI-generated multimedia against works of a same type in a storage; in response to a determination that the AI-generated multimedia fails to match the works of the same type in the storage, identifying, via the copyright claiming module, the AI-generated multimedia as having originality; and storing, via the copyright claiming module, the copyright for the AI-generated multimedia and the AI-generated multimedia in the storage.

In response to a determination that the AI-generated multimedia matches the works of the same type in the storage, the method further comprises: identifying, via the copyright claiming module, the AI-generated multimedia as lacking the originality; receiving, via the copyright claiming module, a notification from the user that the user wishes wait for a future update of a verification policy by queueing the AI-generated multimedia; and storing, via the copyright claiming module, a pending copyright for the AI-generated multimedia in the storage.

The method may further include: utilizing a first smart contract for execution of the AI model; and utilizing a second smart contract to verify the originality of the AI-generated multimedia. The verification policy can be based on an AI model, or crowd voting or a human validator, blind voting or aggregation of those. The selection of this policy or other policies can be done in a decentralized autonomous organization (DAO) manner or in a centralized manner. In a DAO manner, the community organizes voting for selection of a policy. In a centralized manner, an authorized party makes the decision on the policy.

Moreover, the method further includes: utilizing, via the smart contract of the copyright claiming module, the information which are stored in the file and blockchain storage to verify the originality of the AI-generated multimedia; and allow the user to edit some accessory information related to the AI-generated multimedia and write those information to the blockchain (for examples: a title of the multimedia, a private message, an unique identification number).

The method further includes: receiving, via an asset exchanging module of the system, a request from a buyer to use the copyright for the AI-generated multimedia; prompting, via the asset exchanging module, the user to exchange the copyright for the AI-generated multimedia with the buyer for a payment; facilitating, via the asset exchanging module, the exchange between the user and the buyer; and writing, via the asset exchanging module, the exchange to the blockchain. The payment may be split evenly between the user, an AI programmer, and an AI API provider. In other examples, the payment is split disproportionally between the user, an AI programmer, and an AI API provider.

In general, the present invention succeeds in conferring the following benefits and objectives.

It is an objective of the present invention to provide a system and a method for the creation and the exchange of a copyright for each AI-generated multimedia via a blockchain.

It is an objective of the present invention to provide a method and a system for automatically claiming a copyright for AI-generated multimedia.

It is an objective of the present invention to provide an automated and organized system of copyright issuing.

It is an objective of the present invention to provide a verification method utilized with a system that automatically claims a copyright for AI-generated multimedia using blockchain technology.

BRIEF DESCRIPTION OF THE DRAWINGS

FIG. 5B depicts another system configured to create and exchange a copyright for each AI-generated multimedia via a blockchain, according to at least some embodiments disclosed herein.

DESCRIPTION OF THE PREFERRED EMBODIMENTS

Figure 1:
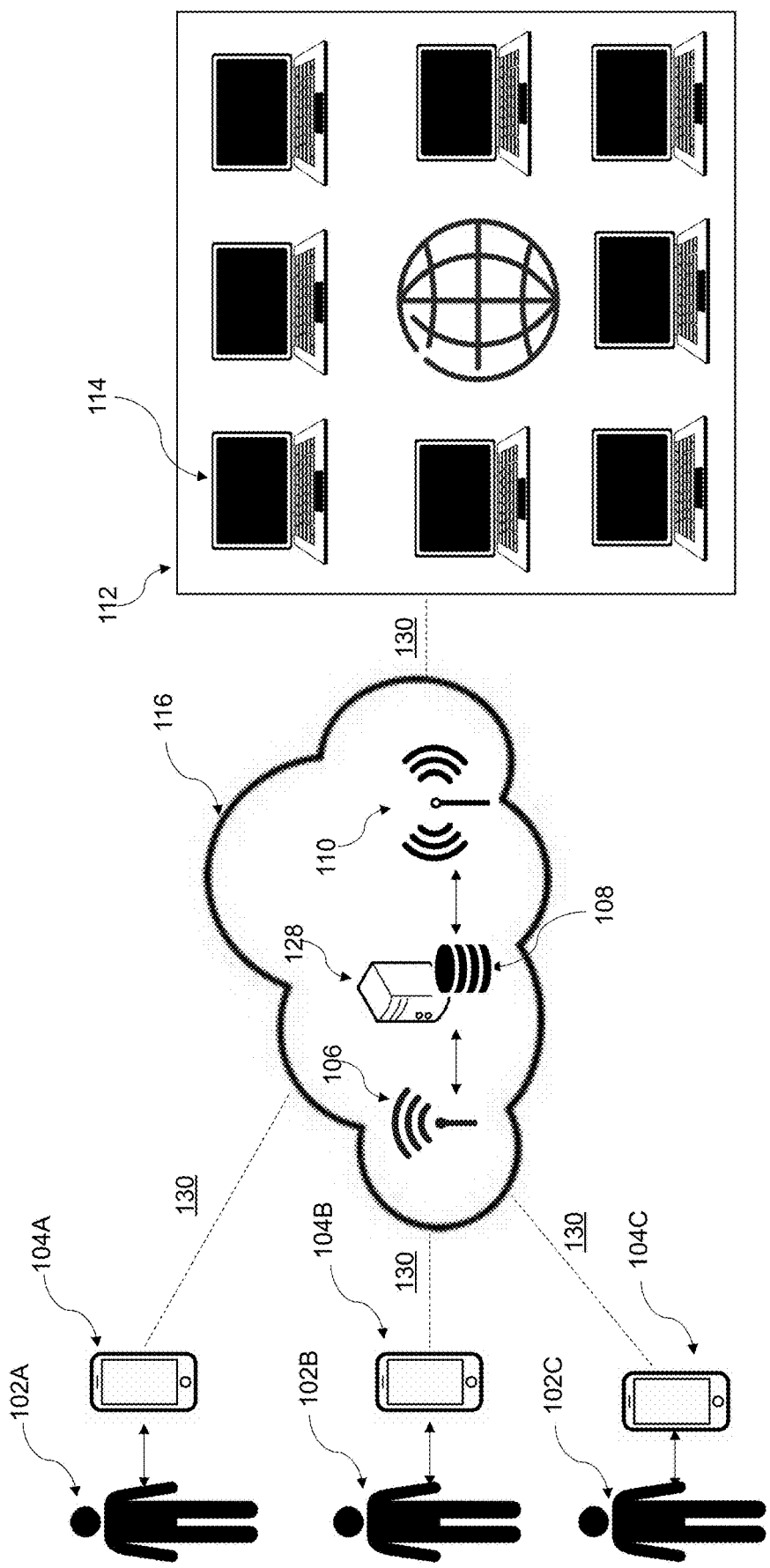
FIG. 1 depicts a schematic diagram of a system configured to create and exchange a copyright for each AI-generated multimedia via a blockchain, according to at least some embodiments disclosed herein.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

As used herein, the term "computer" refers to a machine, apparatus, or device that is capable of accepting and performing logic operations from software code. The term "application", "software", "software code" or "computer software" refers to any set of instructions operable to cause a computer to perform an operation. Software code may be operated on by an "engine" or processor. Thus, the methods and systems of the present invention may be performed by a computer or computing device having a processor based on instructions received by computer applications and software.

The term "electronic device," "mobile device," or "client device," as used herein is a type of computer comprising circuitry and configured to generally perform functions such as recording audio, photos, videos and handwritten notes; displaying or reproducing audio, photos, videos and handwritten notes; storing, retrieving, or manipulation of electronic data; providing electrical communications and network connectivity; or any other similar function. Non-limiting examples of electronic devices include: personal computers (PCs), workstations, laptops, tablet PCs, cell phones, digital music players, digital notepads, digital pens or any electronic device capable of running computer software and displaying information to a user, memory cards, other memory storage devices, digital cameras, external battery packs, external charging devices, and the like. Certain types of electronic devices which are portable and easily carried by a person from one location to another may sometimes be referred to as a "portable electronic device" or "portable device". Some non-limiting examples of portable devices include: cell phones, smartphones, tablet computers, laptop computers, wearable computers such as smartwatches, fitness rings, fitness trackers, etc.

The term "computer readable medium" as used herein refers to any medium that participates in providing instructions to the processor for execution. A computer readable medium may take many forms, including but not limited to, non-volatile media, volatile media, and transmission media. Non-volatile media includes, for example, optical, magnetic disks, and magneto-optical disks, such as the hard disk or the removable media drive. Volatile media includes dynamic memory, such as the main memory. Transmission media includes coaxial cables, copper wire and fiber optics, including the wires that make up the bus. Transmission media may also take the form of acoustic or light waves, such as those generated during radio wave and infrared data communications.

As used herein the term "data network" or "network" shall mean an infrastructure capable of connecting two or more computers such as client devices either using wires or wirelessly allowing them to transmit and receive data. Non-limiting examples of data networks may include the internet or wireless networks or (i.e. a "wireless network") which may include WIFI and cellular networks. For example, a network may include a local area network (LAN), a wide area network (WAN) (e.g., the Internet), a mobile relay network, a metropolitan area network (MAN), an ad hoc network, a telephone network (e.g., a Public Switched Telephone Network (PSTN)), a cellular network, a Zigby network, or a voice-over-IP (VoIP) network.

As used herein, the term "database" shall generally mean a digital collection of data or information. A database may be stored on a remote server and accessed by a client device through the Internet (e.g., the database is in the cloud) or alternatively in some embodiments the database may be stored on the client device or remote computer itself (e.g., local storage). A "data store" as used herein may contain or comprise a database (e.g., information and data from a database may be recorded into a medium on a data store).

Blockchains

As described herein, the term "blockchain" refers to a distributed database that maintains a continuously growing ledger or list of records, called "blocks," secured from tampering and revision using hashes. Every time data is published to a blockchain database, the data may be published as a new block. Each block may include a timestamp and a link to a previous block. Through the use of a peer-to-peer network and a distributed timestamping server, a blockchain database is managed autonomously.

Permissionless blockchains are an open, distributed ledger that can record transactions between two parties efficiently and in a verifiable and permanent way. It should be appreciated that permissioned blockchains are also targeted with this present invention. Consensus ensures that the shared ledgers are exact copies, which lowers the risk of fraudulent transactions. Cryptographic hashes, such as the SHA256 computational algorithm, ensure that any alteration to transaction input results in a different hash value being computed, which indicates a potentially compromised transaction input. Digital signatures ensure that transactions originated from senders (signed with private keys) and not imposters. This covers different approaches to the processing, including hash trees and hash graphs. At its core, a blockchain system records the chronological order of transactions with all nodes agreeing to the validity of transactions using the chosen consensus model. As a result, transactions are irreversible and agreed to by all members in the network.

An example of a blockchain is a cryptocurrency. The cryptocurrency is generated when new blocks are created on the blockchain to confirm transactions of the cryptocurrency. The new blocks may confirm the transfer of cryptocurrency generated in earlier blocks. The blocks on the blockchains are cryptographically proofed and linked to earlier blocks and served as an immutable record of the events in a trustless decentralized peer-to-peer network.

For example, a cryptocurrency (e.g., Bitcoin) is represented as a chain of events that transfers ownership from one party to another party on a blockchain without an intermediary. Each event transferring ownership from one party to another is cryptographically proofed by including the public key of the new owner. Further, each event is digitally signed with the current owner's private key.

A new block in a blockchain is filled with cryptographically proofed events until the block reaches a specified size limit. A hash digest of all the event identifiers within the block and the block header of the previous block are added as the first event in the block. Each block of events may be secured by a race between participants on a peer-to-peer network. In order to win the race the participants collect new events to create the new block, validate the events on the new block by verifying the cryptographic proofs of each event to verify the cryptocurrency was not spent earlier, and solve a mathematical puzzle based on the hash digest, previous block header and a random number. Blockchain provides a mathematical hierarchy of verifiable events that is immutable and is verified at each stage by the race between the participants.

Smart Contracts

The principles used in blockchains may be modified to allow for execution of smart contracts deployed on the blockchain. As defined herein, "smart contracts" are self-executing machine-readable instructions that store state information and are stored on the blockchain. When deployed, the smart contract is assigned a unique address to allow communication to and from the smart contract through messages. The smart contract is deployed by storing the smart contract as an event on the blockchain (e.g., Ethereum™ blockchain). Messages to the smart contract may be posted as events on the blockchain. The smart contract may contain machine-readable instructions and data designed to execute on virtual machines.

Further, the smart contract may have the ability to read or write to its internal storage storing data, read the storage of a received message, and/or send messages to other smart contracts to trigger execution of the code in other distributed applications. When the smart contract is executed on a virtual machine running on the peers securing the blockchain, the resulting data may be saved in the internal storage of the smart contract. The updated smart contract may be stored as an event on a new block. Thus, the smart contract and changes to data are represented as a series of events on the blockchain. Similar to the cryptocurrency blockchain, each block in the blockchain by mining the blockchain by peers based on a consensus protocol.

For example, in a smart contract that governs a sale of an electronic asset, the smart contract may include machine-readable instructions to access its internal storage, to read the storage of a message sent to the smart contract and to process the data in a received message, such as a counter-offer from a buyer. When the buyer sends a counter-offer to the smart contract, the smart contract may update its internal storage to include the counter-offer event, such as the identity of the buyer. The updated smart contract may be recorded as an event (e.g., a transaction) on a new block on the blockchain. As such, the blockchain stores the changes in the state of the smart contract as a series of events (e.g. a transaction).

Cryptographic Digital Assets

As explained, the smart contract governs a sale of an electronic asset, a "cryptographic digital asset," or a "digital asset," which refers to any computer-generated virtual object, including digital apparel, avatars, pets, art, etc., that have a unique, non-fungible tokenized code ("NFT") registered on and validated by a blockchain platform or registered in an immutable database. Specifically, NFT's describe blockchain-based cryptographic tokens that are created with respect to a specific piece of content, which incorporate programmatically defined digital rights management. The metadata associated with an NFT may also include digital media assets such as, but not limited to, images, videos about the specific NFT or the context in which it was created (studio, film, band, company song etc.). In a number of embodiments, content creators can issue NFTs to users within the platform.

In many instances, each NFT has a unique serial number and the NFT smart contract defines an interface that enables the NFT to be managed, owned and/or traded. Standards for defining interfaces for building NFTs on the Ethereum blockchain include: ERC-721 and/or ERC-1155, among others, the disclosures of which are incorporated by reference in their entirety. NFTs can be contrasted with interchangeable or fungible tokens (e.g. Ether). Fungible tokens can be implemented on the Ethereum blockchain based upon standard interfaces, such as the ERC-20 standard, the disclosure of which is incorporated by reference in its entirety.

In a number of embodiments, the smart contracts defining NFTs that can be minted within platforms specify fee distribution obligations with respect to specific types of transactions involving NFTs. In several embodiments, the sale of an NFT within a platform can result in one or more residual royalty payment transactions that are recoded in the blockchain, such as: a residual royalty payment to the content creator that minted the NFT, an AI programmer, and/or an AI API provider.

In some examples, the authenticity of a particular NFT can be verified independently of the content creator by auditing transaction records associated with the NFT within the blockchain to confirm consistency with the smart contract underlying the NFT. For example, the presence of transactions reflecting residual royalty payments that a smart contract indicates should have occurred upon transfers of the NFT can be relied upon to verify the authenticity of the NFT. Moreover, in embodiments, "wallet applications" enable users to securely store NFTs and/or other tokens on their devices.

Intellectual Property

Intellectual property serves as the foundation of innovation in our economy, where government-granted rights incentivize discovery and creativity by providing creators with an opportunity to profit from the value of their innovative work. In exchange, the creative work is, after a given time period, made public so that others may build on and benefit from the work of the original creator. Laws protecting intellectual property reduce the transaction costs between inventors and industry by providing information about the quality of the invention without jeopardizing the ownership of the idea.

Generally, four types of intellectual property exist to protect an innovative idea or invention, which include: (a) a trade secret, (b) a trademark, (c) a copyright, and (d) a patent. Of particular interest, a copyright protects original works of authorship, including literary, dramatic, musical, and artistic works, such as poetry, novels, movies, songs, computer software, and architecture.

Artificial Intelligence

Artificial intelligence (AI) is a field of computer science involved with developing a computer's capacity to behave as an intelligent entity. See, Jessica L. Gillotte, "Copyright Infringement in AI-Generated Artworks," University of California Davis Law Review, 2020, 53(2655), Pages 2655-2691; and Atilla Kasap, "Copyright and Creative Artificial Intelligence (AI) Systems: A Twenty-First Century Approach to Authorship of AI-Generated Works in the United States," Wake Forest Intellectual Property Law Journal, 2019, 19(4), Pages 335-380, the entire contents of which are hereby incorporated by reference in their entirety. There are numerous sub-fields of AI research, such as machine learning. Generally, machine learning is a process by which AI extrapolates patterns from large quantities of data and uses those patterns to learn the constraints of the output it is expected to produce without being explicitly programmed to produce it. During machine learning, the AI program receives feedback and refines its underlying algorithm to improve its performance of the task over time. An AI program can learn by receiving feedback from two alternative methods of training: supervised learning and unsupervised learning.

AI has been used to generate art for almost fifty years. See, Jessica L. Gillotte, "Copyright Infringement in AI-Generated Artworks," University of California Davis Law Review, 2020, 53(2655), Pages 2655-2691, the entire contents of which are hereby incorporated by reference in their entirety. In fact, one of the earliest uses of AI to create art was a computer system created by Harold Cohen in 1973 called "AARON." Harold Cohen taught AARON to draw the way an adult might teach a child to draw, for example, by teaching a child to enclose line scribbles in a closed form. See generally, Arthur R. Miller, "Copyright Protection for Computer Programs, Databases, and Computer-Generated Works: Is Anything New Since CONTU?," 106 Harv. L. Rev. 977, 1047 (1993), the entire contents of which are hereby incorporated by reference in their entirety.

In fact, a complex neural network—Generative Adversarial Network (GAN)—is commonly used to create AI-generated artwork. GANs take a game theoretical approach to machine learning by making use of two simultaneously trained networks that are tasked with outperforming each other. The first network, or the generative model, begins with a sample of random data and generates a random output image. Since the data used to generate the image is random, the first several images created by the GAN's generative model will appear crude and shapeless. Then, the second network, or the discriminative model, tries to determine whether the generative model's output image is generated or real. Both networks are trained via backpropagation, and, as the generative model and discriminative model try to outmaneuver one another, the overall performance of the GAN improves. Thus, over time, the GAN's generative model creates images that are more difficult to distinguish from the real ones. Over time, the generated output images are no longer distinguishable from the real images. See, Jessica L. Gillotte, "Copyright Infringement in AI-Generated Artworks," University of California Davis Law Review, 2020, 53(2655), Pages 2655-2691, the entire contents of which are hereby incorporated by reference in their entirety. Other ways to generate the AI-generated multimedia besides GANs include generative models using machine learning or deep learning. In other implementations, signal processing or image processing algorithms can be used to generate such AI-generated multimedia. It should be appreciated that these examples are provided for illustrative purposes only and other examples are contemplated.

The instant invention provides a method and system for automatically generating and claiming a copyright for AI-generated multimedia. It should be appreciated that AI-generated multimedia may be created in any way known to one having ordinary skill in the art, such as through use of the GAN discussed herein. The core purpose of copyright law, as stated expressly, is "to promote the progress of science and useful arts," or in other words, to promote the progress of knowledge and learning. As such, AI-generated multimedia entails progresses of science on themselves and are, therefore, targeted for a kind of copyright protection.

Invention

FIG. 1 depicts a schematic diagram of a system configured to create and exchange a copyright for each AI-generated multimedia via a blockchain, according to at least some embodiments disclosed herein. As described herein, "exchange" means trading, renting, loaning, or lending.

A system of FIG. 1 is configured to facilitate the transfer of data and information between one or more access points 106, 110, one or more client devices 104A, 104B, and 104C, and one or more servers 128 over a data network 116. It should be appreciated that the quantity of the one or more client devices 104A, 104B, and 104C is not limited to any particular quantity. Moreover, it should be appreciated that a first client device 104A of the one or more client devices 104A, 104B, and 104C is associated with a first user 102A, a second client device 104B of the one or more client devices 104A, 104B, and 104C is associated with a second user 102B, and a third client device 102C of the one or more client devices 104A, 104B, and 104C is associated with a third user 102C, respectively.

Each of the one or more client devices 104A, 104B, and 104C may be a mobile device, a laptop, a tablet computer, a smart phone, a personal digital assistant, etc., that is equipped with a wireless network interface capable of sending data to the one or more servers 128 with access to one or more data stores 108 over the data network 116, such as a wireless local area network (WLAN). Additionally, in other embodiments, each of the one or more client devices 104A, 104B, and 104C may be physical fixed devices that are equipped with a wireless or wired network interface capable of sending data to the one or more servers 128 with access to the one or more data stores 108 over a wireless or wired local area network.

The present invention may be implemented on at least one client device of the one or more client devices 104A, 104B, and 104C and/or at least one server of the one or more servers 128 programmed to perform one or more of the steps described herein. In some embodiments, more than one of the one or more client devices 104A, 104B, and 104C and/or the one or more servers 128 may be used, with each being programmed to carry out one or more steps of a method or process described herein. Each of the one or more client devices 104A, 104B, and 104C may send data to and receive data from the data network 116 through a network connection 130 with an access point of the one or more access points 106, 110. The one or more data stores 108 may contain one or more databases (such as a distributed blockchain database and/or a ledger blockchain database, among others).

The system 100 also includes a blockchain network 112 that comprises one or more nodes 114, which may be in communication with one or more servers 128, and/or the one or more client devices 104A, 104B, and 104C. A node of the one or more nodes 114 may be a server of the one or more servers 128, a client device of the one or more client devices 104A, 104B, and 104C, or any other suitable networked computing platform. The blockchain network 112 may manage a distributed blockchain database that contains data recorded by the system 100. This data may be maintained as a continuously growing ledger or listing, which may be referred to as blocks, secured from tampering and revision. Each block includes a timestamp and a link to a previous block.

Through the use of a peer-to-peer blockchain network 112 and a distributed timestamping server of the one or more servers 128, a ledger blockchain database may be managed autonomously. Consensus ensures that the shared ledgers are exact copies, and lowers the risk of fraudulent transactions. Cryptographic hashes are used to ensure that any alteration to transaction data input results in a different hash value being computed. Further, digital signatures ensure that data entry transactions (e.g., data added to the ledger blockchain database) originated from senders (signed with private keys). Further, the ledger blockchain database may record the chronological order of data entry transactions with the one or more nodes 114 agreeing to the validity of entry transactions using the chosen consensus model. The result is data entry transactions that are irreversible and agreed to by all members in the blockchain network 112.

Moreover, the blockchain network 112 may comprise a cryptocurrency or digital asset designed to work as a medium of exchange that uses cryptography to: secure its transactions, to control the creation of additional units, and to verify the transfer of assets. Example cryptocurrencies include Bitcoin, Etherium, Ripple, etc. The blockchain network 112 may also comprise tokens common to cryptocurrency based blockchain networks 112.

Figure 2:
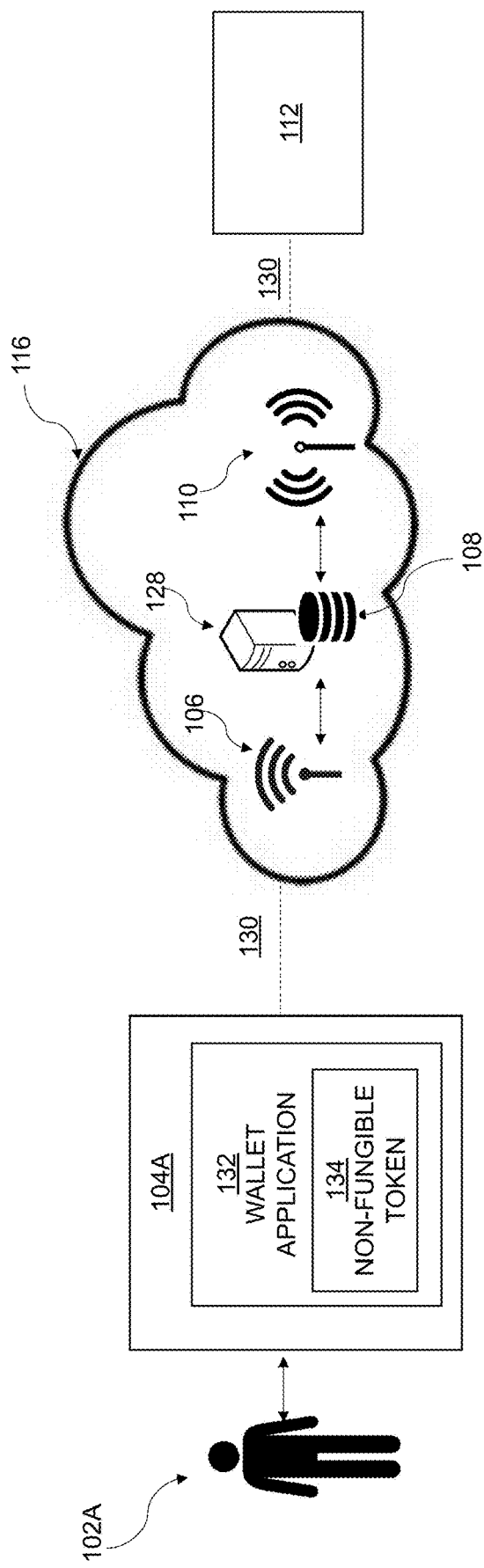
FIG. 2 depicts another schematic diagram of a system configured to create and exchange a copyright for each AI-generated multimedia via a blockchain, according to at least some embodiments disclosed herein.
Figure 3:
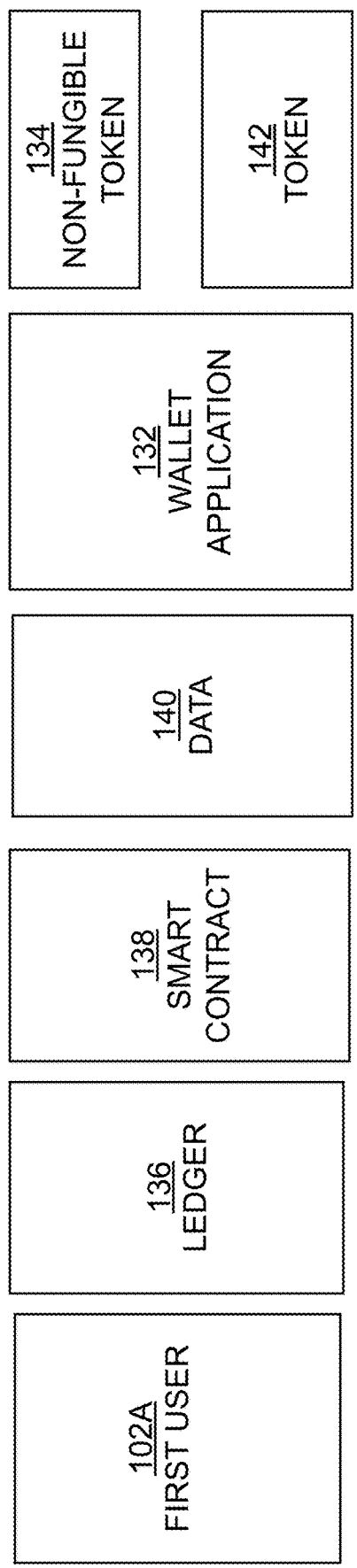
FIG. 3 depicts a block diagram of components of a platform configured to create and exchange a copyright for each AI-generated multimedia via a blockchain, according to at least some embodiments disclosed herein.

FIG. 2 depicts another schematic diagram of a system configured to create and exchange a copyright for each AI-generated multimedia via a blockchain, according to at least some embodiments disclosed herein. FIG. 3 depicts a block diagram of components of a platform configured to create and exchange a copyright for each AI-generated multimedia via a blockchain, according to at least some embodiments disclosed herein.

A platform, as shown in FIG. 3, utilizes one or more immutable ledgers 136 (e.g., one or more blockchains) to enable a number of verified content owners (e.g., the first user 102A) to access an NFT service to mint NFTs 134 in numerous forms, such as: proof of ownership of tangible collectibles, proof of ownership of AI-generated multimedia, etc. In addition, a smart contract 138 underlying the digital tickets can require residual payments when the NFTs 134 are transferred on a secondary market.

Issuance of the NFTs 134 via the platform enables verification of the authenticity of the NFTs 134 independently of the content owner by confirming that transactions written to one or more of the immutable ledgers 102 are consistent with the smart contracts 108 underlying the NFTs. In examples, the smart contracts 138 underlying the NFTs 134 may cause payments of residual royalties when users engage in specific transactions involving the NFTs 134 (e.g., transfer of ownership of the NFT 134). In examples, the first user 102A, the second user 102B, and/or the third user 102C may utilize wallet applications 132 on their devices (e.g., the one or more client devices 104A, 104B, and 104C) to store the NFTs 134 distributed using the platform.

The NFTs 134 that are implemented using the smart contract 138 comprise interfaces that comply with open standards and are not limited to being stored within wallets. Furthermore, the instant invention supports moving the NFTs 134 between different immutable ledgers 136.

In examples, when the wallet application 132 is installed upon a user device (e.g., the one or more client devices 104A, 104B, and 104C), the wallet application 132 collects data. In some examples, the data 140 is written to the immutable ledger 136 that is configured as a permissioned blockchain. In some examples, the manner in which the data 140 is written to the immutable ledger 136 enables the wallet application 132 to grant permissions with respect to access of the data 140.

The first user 102A, the second user 102B, and/or the third user 102C may determine the manner in which the data 140 is accessed and by whom. In many instances, the first user 102A, the second user 102B, and/or the third user 102C can also revoke access to the data 140 stored within the immutable ledger 136 using the wallet application 132. In further examples, content creators (e.g., the first user 102A, the second user 102B, and/or the third user 102C) can incentivize another user to grant access to the data 140 within the immutable ledger 136 using offers of tokens 142 and/or the NFTs 134.

Figure 4:
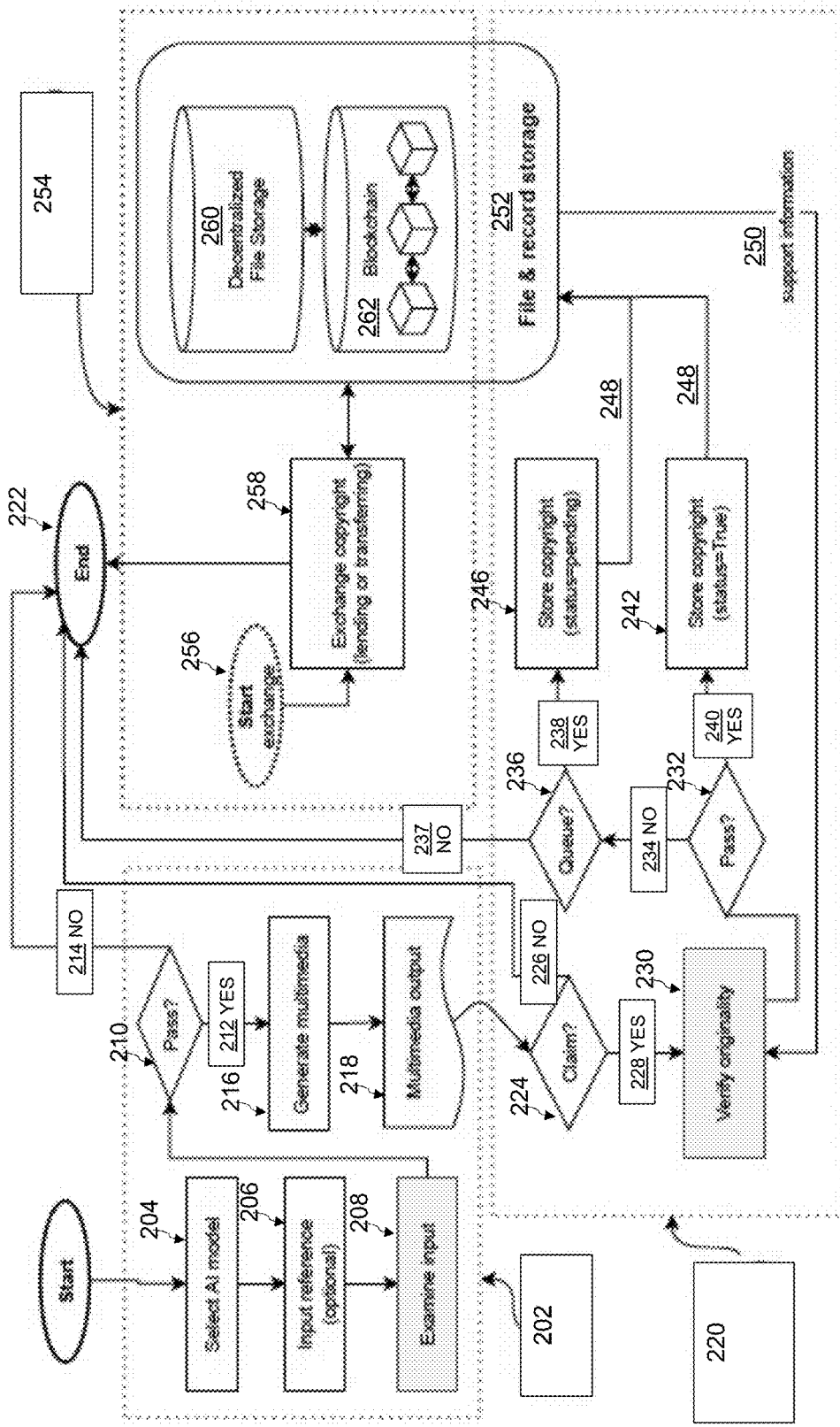
FIG. 4 depicts a flowchart for a method executed by a system configured to create and exchange a copyright for each AI-generated multimedia via a blockchain, according to at least some embodiments disclosed herein.

FIG. 4 depicts a flowchart for a method executed by a system configured to create and exchange a copyright for each AI-generated multimedia via a blockchain, according to at least some embodiments disclosed herein.

As shown in FIG. 4, the system configured to execute the method for creating and exchanging the copyright for each AI-generated multimedia may include three modules: a multimedia generation module 202, a copyright claiming module 220, and an asset exchanging module 254. It should be appreciated that other modules may be used within this system that are not explicitly described herein.

The method of FIG. 4 begins at a process step 204, where the multimedia generation module 202 receives a user selection of an AI model from a list of AI models for many types of multimedia generation (e.g., text, graphics, animations, videos, and/or sound, etc.). Each AI model of the AI modules is associated with a first identifier associated with the programmer (e.g., who coded the model or trained the model) and a second identifier of the provider (e.g., who made the AI model available for usage). Examples of the AI models include image generation models (such as CycleGAN or Pix2Pix), music generation models (such as Remi or Magenta), poem generation models, text generation models, animation generation models, gesture animation models from videos, and many others. It should be appreciated that these examples are provided for illustrative purposes only and other example AI models are contemplated by the Applicant.

It should be appreciated that the user (e.g., the first user 102A) and an AI programmer 346 use the AI model to generate the data. An AI API provider 348 makes the AI model available for the first user 102A. All of these parties are considered to be related to the discovery and creation of the AI-generated multimedia and should receive royalties from any profit resulting from exchanging the data, as will be discussed in turn.

Next, an optional process step 206 may follow the process step 204 that includes the multimedia generation module 202 receiving an input from a user of a reference associated with the multimedia. Such reference may include a photograph, text (e.g., a text input for a category a or label, such as "dog", "cat", etc.), video (e.g., from videos to make a new animation), music (e.g., a reference to Mozart to make a new piece of music), etc. It should be appreciated that these references are provided for illustrative purposes only and other references are contemplated. In this example, in response to receiving the photograph of a painting, the AI model may generate the painting to create the AI-generated multimedia.

Then, a process step 208 occurs where the multimedia generation module 202 examines the reference input. Such examination may involve determining if the reference input is appropriate in view of system policies. The system policies may include rules associated with restricted content, child endangerment, inappropriate content, sexual content, profanity, hate speech, violence, terrorist, bullying, harassment, dangerous products, etc. In a first example, the process step 208 may occur as an automatic method using the AI model. In a second example, the process step 208 may occur using human intervention. Such examination may also involve referencing one or more databases to perform a legal check for the reference input.

A process step 210 follows the process step 208 and includes the multimedia generation module 202 determining if the reference input passes the examination of the process step 208. A "YES" response 212 or a "NO" response 214 may follow the process step 210. If the "YES" response 212 occurs, a process step 216 then occurs, where the multimedia generation module 202 executes the AI model to generate the AI-generated multimedia. Such AI-generated multimedia is outputted at a process step 218. Subsequent the "NO" response 214, the process is ended at a process step 222.

A process step 224 follows the process step 218, which involves the copyright claiming module 220 executing numerous process steps. The user (e.g., the first user 102A) becomes the creator of the AI-generated multimedia and has a choice, at a process step 224, to claim a copyright to the AI-generated multimedia. A process step 226 or a process step 228 may follow the process step 224. The process step 226 is a "NO" response to the process step 224. Subsequent the process step 226, the process is ended at the process step 222.

The process step 228 is a "YES" response to the process step 224. Subsequent the process step 228, a process step 230 occurs, where the copyright claiming module 220 verifies the AI-generated multimedia for originality. At this process step, the copyright claiming module 220 checks the originality of the AI-generated multimedia by comparing the AI-generated multimedia to all works of the same type in a file and record storage 252. Moreover, at a process step 250, support information may be used from the file and record storage 252 to verify the originality at the process step 230. Such information may be written to the blockchain for the copyright record. Moreover, the AI-generated work multimedia work is stored to a decentralized file storage 260.

A process step 232 determines if the AI-generated work passes the process step 230. A "YES" response 240 or a "NO" response 234 may follow the process step 232. A process step 242 follows the "YES" response 240, where a true copyright for the AI-generated multimedia is stored. Then, the copyright for the AI-generated multimedia is transmitted at a process step 248 to the file and record storage module 252. The file and record storage 252 may include a decentralized file storage 260 and a blockchain 262. The associated copyright will be stored to the blockchain 262.

In response to the "NO" response 234, a process step 236 occurs where the user (e.g., the first user 102A) can choose if the user (e.g., the first user 102A) wishes to wait for a future update of the verification policy by queueing the AI-generated multimedia or ending the process. A "YES" response 238 or a "NO" response 237 follows the process step 236. If the "NO" response 237 follows the process step 236, the process is ended at the process step 222.

A process step 246 follows the "YES" response 238, where the copyright claiming module 220 stores the pending copyright for the AI-generated work. Then, the copyright for the AI-generated work is transmitted, by the copyright claiming module 220, at the process step 248 to the file and record storage module 252.

The asset exchanging module 254 of FIG. 4 allows for the buying users (e.g., a buyer 364 of FIG. 8 and FIG. 9) to browse and filter all AI-generated multimedia. When the buyer 364 wishes to use the AI-generated multimedia, the first user 102A exchanges the copyright for the AI-generated multimedia with the buyer 364 for a short time period or transfers the copyright for the AI-generated multimedia to the buyer 364 in exchange for the NFTs 134. This exchanging of information is written to the blockchain 262, while the file is not changed. For example, as shown in FIG. 4, an exchange occurs at a process step 256. A process step 258 follows the process step 256 and includes exchanging the copyright information for the AI-generated multimedia to the file and record storage 252.

Thus, as described, the instant invention provides a method and system for automatically generating a copyright for an AI-generated multimedia. When one person/user uses a smart contract that allows AI model execution to generate data, the person is automatically given a copyright associated with the data. When the person decides to claim the copyright, the system executes another smart contract to verify the originality of the content of the data in the whole blockchain database. It should be appreciated that once the smart contract 138 is executed, the payment is executed. This way of writing enhances the trust between parties and eliminates the intermediaries (such as a bank). As a result, the transparency of the system is improved.

If the work is new and original (defined by the work never having been written on the blockchain before), the copyright is assigned to the user and immutably written to the blockchain, meaning the copyright will be recognized for future exchanging events. Otherwise, the data is stored on a queue and can be re-examined for the copyright when the system updates the originality verification policies. The copyrighted data can be then exchanged in various forms: lending (for display, print, publish, vend, perform, adapt and/or reproduction) or transferring. The advantages of this method and system include: (1) providing an automated and organized system of copyright issuing and (2) the decentralized nature of the blockchain technology makes it (i) fast in execution, (ii) trustful, and (iii) efficient, as well as openly accessible and traceable. The governance of policies in the system can be done in a decentralized autonomous organization (DAO) manner or in a centralized manner.

Specifically, the DAO is an organization represented by rules encoded as a computer program that is transparent, controlled by the organization members and not influenced by a central government. A DAO's financial transaction record and program rules are maintained on a blockchain.

Moreover, the DAOs are typified by the use of blockchain technology to provide a secure digital ledger to track financial interactions across the Internet. This approach eliminates the need to involve a mutually acceptable trusted third party in a financial transaction, thus simplifying the transaction. The costs of a blockchain-enabled transaction and of the associated data reporting may be substantially offset by the elimination of both the trusted third party and of the need for repetitive recording of contract exchanges in different records. In a centralized manner, the group of specific people will decide if the proposal should be applied.

Figure 5A:
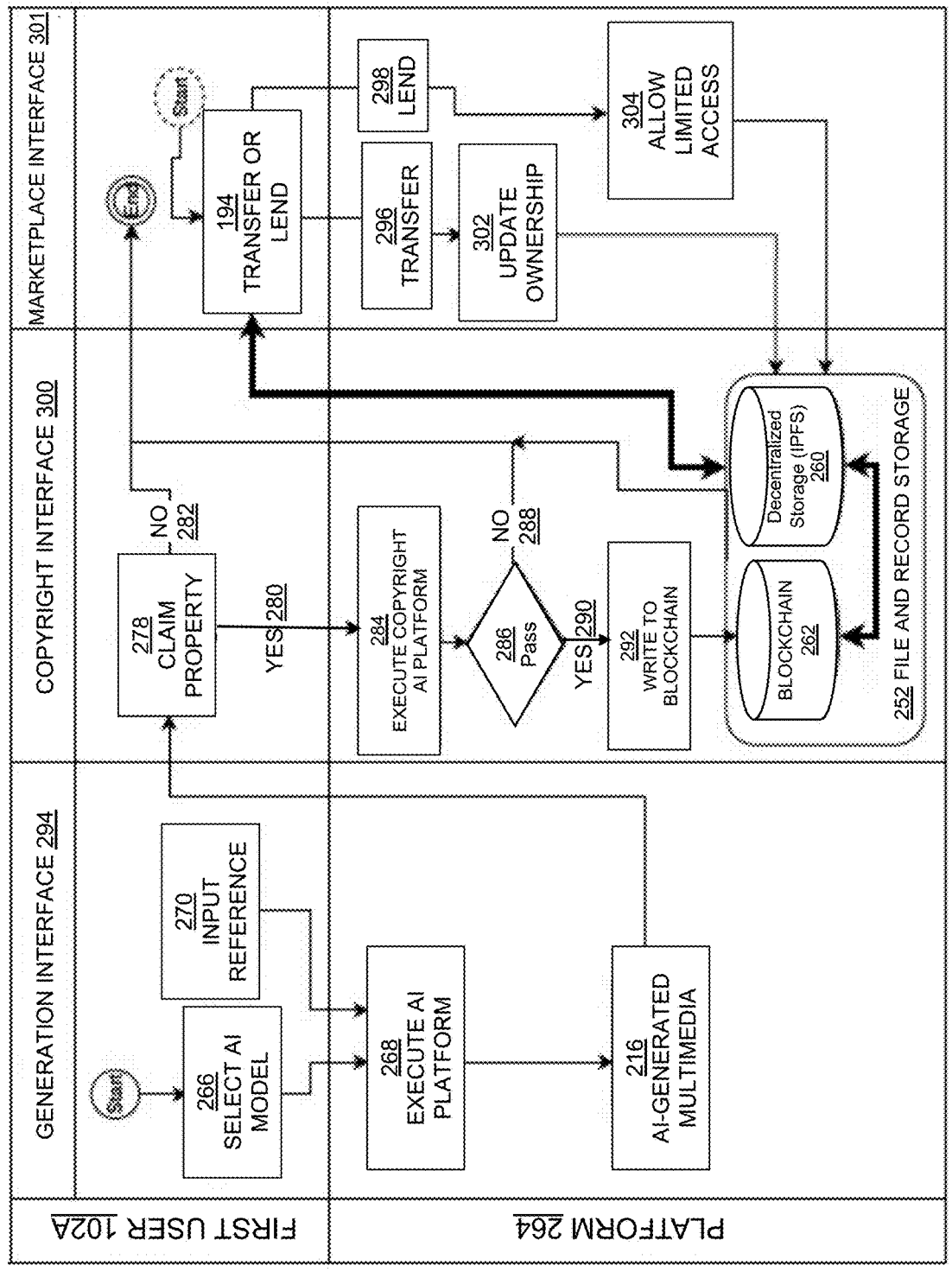
FIG. 5A depicts a system configured to create and exchange a copyright for each AI-generated multimedia via a blockchain, according to at least some embodiments disclosed herein.

FIG. 5A depicts a system configured to create and exchange a copyright for each AI-generated multimedia via a blockchain, according to at least some embodiments disclosed herein.

Specifically, FIG. 5A utilizes multiple user interfaces for generating multimedia and exchanging the copyright for the multimedia. As described herein, the user interfaces may equip users with functionalities to use, trade, destroy, upgrade, combine, rent, loan, or lose the generated multimedia.

The system of FIG. 5A includes a platform 264 and the first user 102A. The multiple interfaces of FIG. 5A include: a generation interface 294, a copyright interface 300, and a marketplace interface 301. The system of FIG. 5A executes a method that begins at a process step 266, where the first user 102A selects an AI model via the generation interface 294. The first user 102A may also input a reference via the generation interface 294 at a process step 270.

Then, a process step 268 occurs, where the AI platform (e.g., the platform 264) is executed. Next, the AI-generated multimedia 216 is created or generated. Next, the copyright interface 300 prompts the first user 102A to claim property to the AI-generated multimedia 216 at a process step 278. If the first user 102A wishes to claim property to the AI-generated multimedia 216 (e.g., follow a "YES" step 280), then, the copyright AI platform is executed at a process step 284. If the first user 102A does not wish to claim property to the AI-generated multimedia 216 (e.g., follow a "NO" step 282), then, the method ends.

Subsequent the process step 284, a process step 286 occurs where it is determined if the AI-generated multimedia passes an examination process. A "YES" response 290 or a "NO" response 288 follows the process step 286. In response to the "YES" response 290, a process step 292 occurs where the copyright for the AI-generated multimedia is written to the blockchain 262. The blockchain 262 and the decentralized storage (IPFS) 260 are part of the file and record storage 252. In response to the "NO" response 288, the method is ended.

At the marketplace interface 301, transferring or lending of the copyright for the AI-generated multimedia may occur at a process step 194 between the first user 102A (e.g., the owner of the copyright for the AI-generated multimedia) and another user/buyer. Such transferring of the copyright for the AI-generated multimedia may occur at a process step 296 and such lending of the copyright for the AI-generated multimedia may occur at a process step 298. In response to the transferring of the copyright for the AI-generated multimedia at the process step 296, ownership of the copyright for the AI-generated multimedia may be updated at a process step 302. Such update may be stored in the file and record storage 252. Moreover, in response to the lending of the copyright for the AI-generated multimedia at the process step 298, limit access may be allowed to the copyright for the AI-generated multimedia at a process step 304. Such information/data may be stored in the file and record storage 252.

FIG. 5B depicts another system configured to create and exchange a copyright for each AI-generated multimedia via a blockchain, according to at least some embodiments disclosed herein.

Specifically, FIG. 5B explains how one can adapt the mechanism described herein to any editing platform (such as an image editing platform like Photoshop, a video editing platform, or a music editing platform, etc.). If the platform is equipped with a monitoring AI model, one can verify the origin of the generated multimedia and hence, can use the copyright claiming flow and the multimedia for exchanging purposes.

The system of FIG. 5B includes the platform 264 and multiple interfaces, such as the generation interface 294, the copyright interface 300, and the marketplace interface 301. A method of FIG. 5B begins at a process step 386, where the first user 102A connects to the wallet via the generation interface 294. Next, a process step 388 follows the process step 386 and includes executing an editing platform. Then, a process step 390 follows the process step 388 and includes generating the multimedia. In some embodiments, a process step 292 occurs in conjunction with the process step 388 and includes executing the monitoring AI platform.

Subsequent the process step 390, a process step 394 occurs, where the copyright interface 300 prompts the first user 102A to claim property to the AI-generated multimedia 216. A "YES" response 398 or a "NO" response 396 follows the process step 394. Subsequent the "NO" response 396, the method is ended. Following the "YES" response 398, a process step 400 occurs where the copyright AI platform is executed.

Subsequent the process step 400, a process step 402 occurs where it is determined if the AI-generated multimedia passes an examination process. A "YES" response 406 or a "NO" response 404 follows the process step 402. Subsequent the "NO" response 404, the method is ended. Subsequent the "YES" response 406, a process step 408 occurs where the copyright for the AI-generated multimedia is written to the blockchain 262. The blockchain 262 and the decentralized storage (IPFS) 260 are parts of the file and record storage 252.

Moreover, at the marketplace interface 301, transferring or lending of the copyright for the AI-generated multimedia may occur at a process step 410 between the first user 102A (e.g., the owner of the copyright for the AI-generated multimedia) and another user/buyer. Such transferring of the copyright for the AI-generated multimedia may occur at a process step 412 and such lending of the copyright for the AI-generated multimedia may occur at a process step 414. In response to the transferring of the copyright for the AI-generated multimedia at the process step 412, ownership of the copyright for the AI-generated multimedia may be updated at a process step 416. Such update may be stored in the file and record storage 252. Moreover, in response to the lending of the copyright for the AI-generated multimedia at the process step 414, limit access may be allowed to the copyright for the AI-generated multimedia at a process step 418. Such information/data may be stored in the file and record storage 252.

Figure 6:
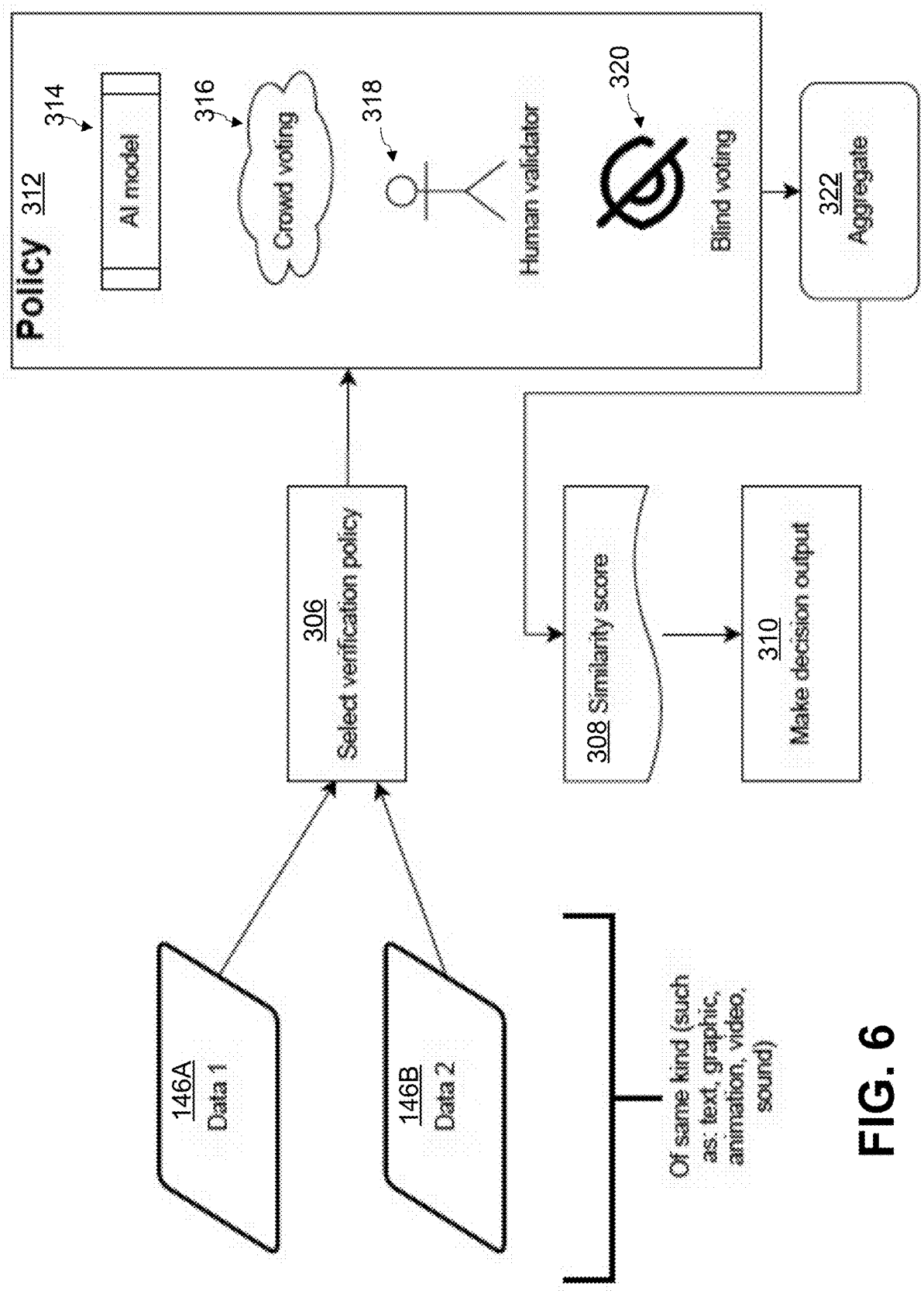
FIG. 6 depicts a schematic diagram of originality verification executed by a system, according to at least some embodiments disclosed herein.

FIG. 6 depicts a schematic diagram of originality verification executed by a system, according to at least some embodiments disclosed herein.

As shown in FIG. 6, first data 146A and second data 146B associated with the AI-generated multimedia may be verified via a verification policy 312 at a process step 306. The first data 146A and the second data 146B may be of the same kind (such as text, graphics, animation, video, sound, etc.). The verification policy 312 of the process step 306 may be selected by the first user 102A. Further, the verification policy 312 of the AI-generated multimedia is based on pair-comparison between two data objects of the same type. In examples, the verification policy 312 may be based on an AI model 314, crowd voting 316, a human validator 318, and/or blind voting 320.

Specifically, the AI model 314 for comparison takes two objects as input and calculates the similarity between the two inputs. The crowd voting 316 utilizes multiple humans (e.g., a crowd) on the Internet to perform a voting (either binary, or ordinal scale scores like 1 to 5 or 1 to 10). The human validator 318 is an expert for verification. Moreover, the blind voting 320 involves comparing two objects without knowing the details or history of them. Further, aspects/components of the verification policy 312 may be aggregated from multiple sources at a process step 322. The aggregation at the process step 322 returns a similarity score at a process step 308 and a threshold-based decision at a process step 310.

It should be appreciated that, as described herein, the verification policy 312 is subject to change based on changes to copyright law, algorithmic changes to compute the originality, algorithmic changes to compute the legal clauses, and/or changes of purpose of the module. The verification policy 312 is made in the DAO or the centralized manner.

Figure 7:
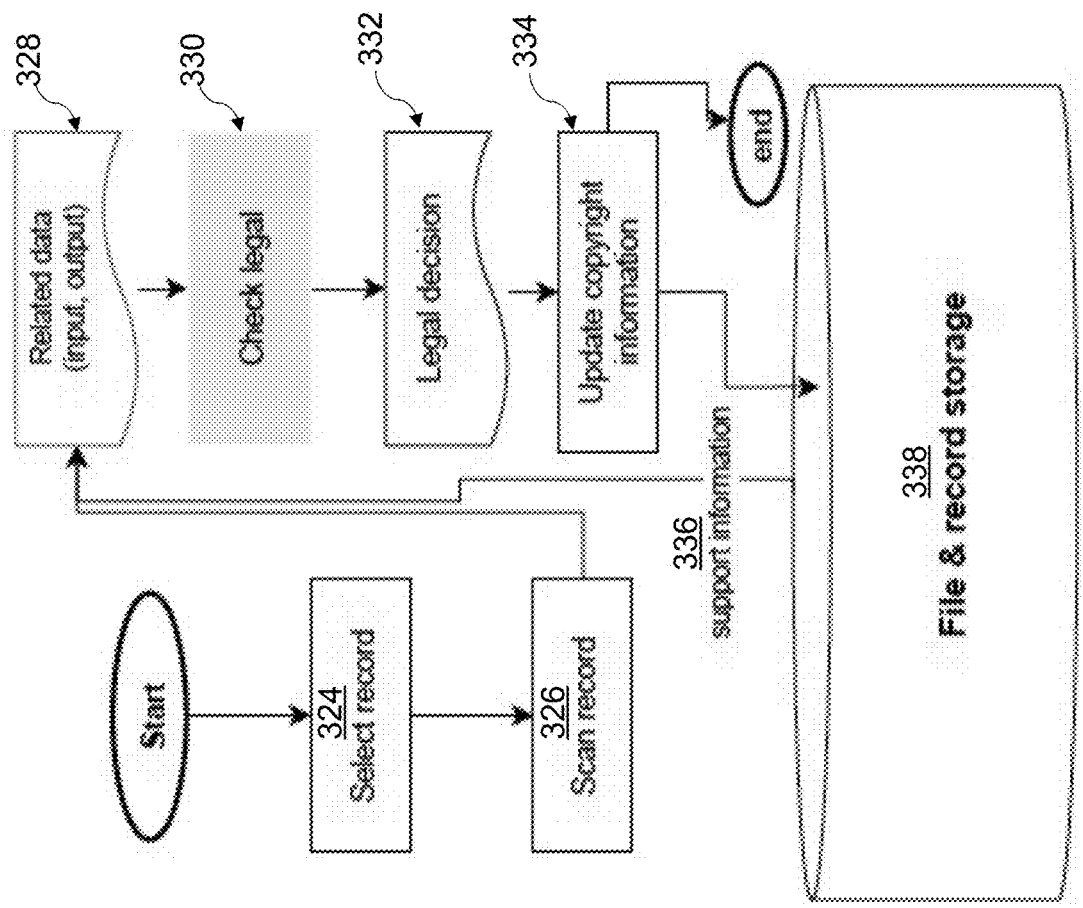
FIG. 7 depicts a schematic diagram showcasing a mechanism for conflict handling with legal checking executed by a system, according to at least some embodiments disclosed herein.

FIG. 7 depicts a schematic diagram showcasing a mechanism for conflict handling with legal checking executed by a system, according to at least some embodiments disclosed herein.

As shown in FIG. 7, at a process step 324, a record identifier associated with an AI-generated model is selected. Next, a process step 326, a storage is scanned. Then, a process step 328 occurs, where related data (such as an input, an output, or the copyright for the AI-generated multimedia) is identified. Next, at a process step 330, a legal component is analyzed. The legal component is a computer program that computes the legal correctness according to current regulations, copyright laws, etc. to return a legal decision. A legal decision is identified at a process step 332. Depending on the decision at the process step 332, the corresponding copyright information for the AI-generated multimedia can be updated (either it's "okay", "arguable" or "removable") at a process step 334. Subsequent the process step 334, various information is stored in the file and record storage 338. Next, the process of FIG. 7 ends.

Figure 8:
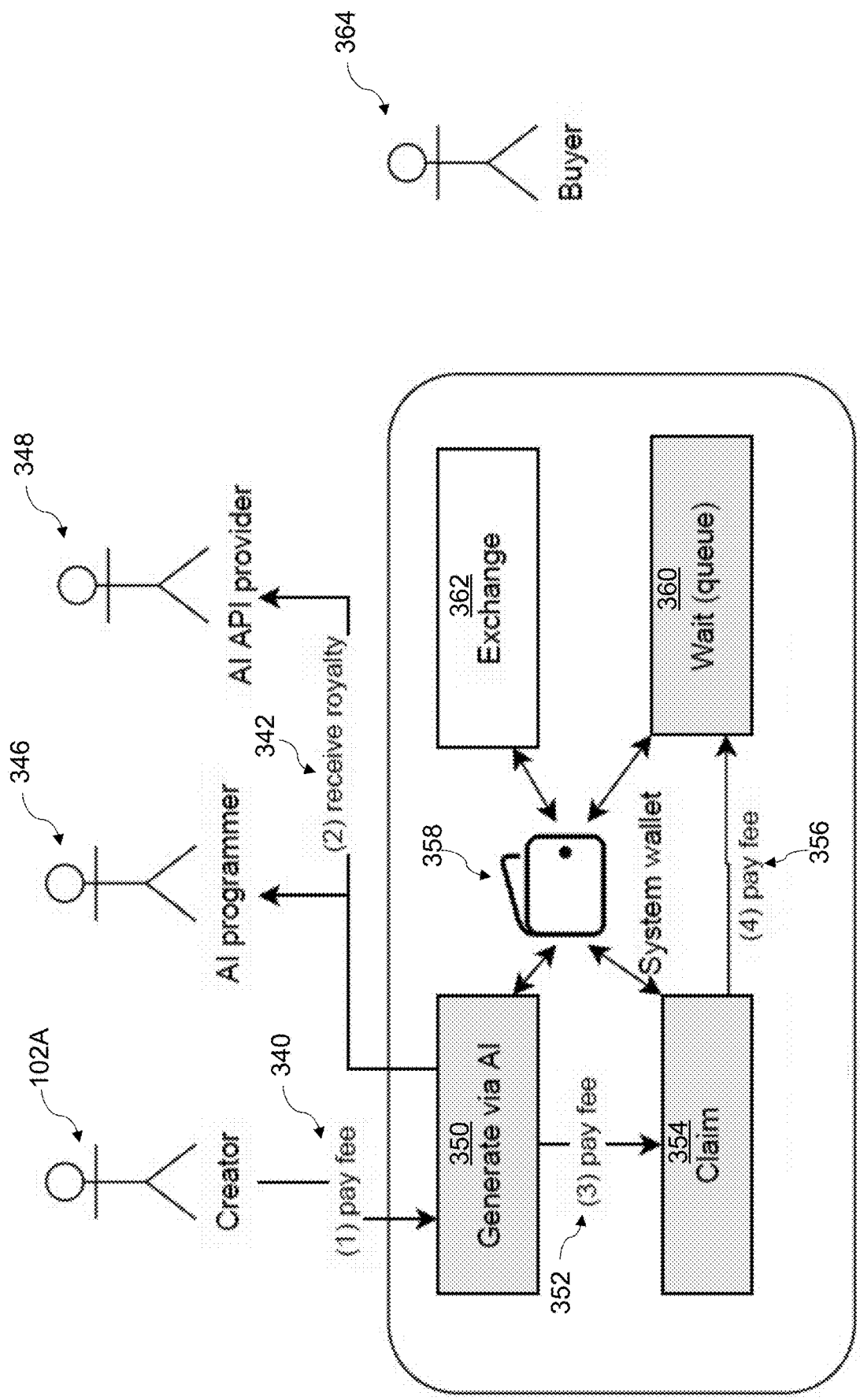
FIG. 8 depicts a schematic diagram showcasing currency flow when creating AI-generated multimedia, according to at least some embodiments disclosed herein.
Figure 9:
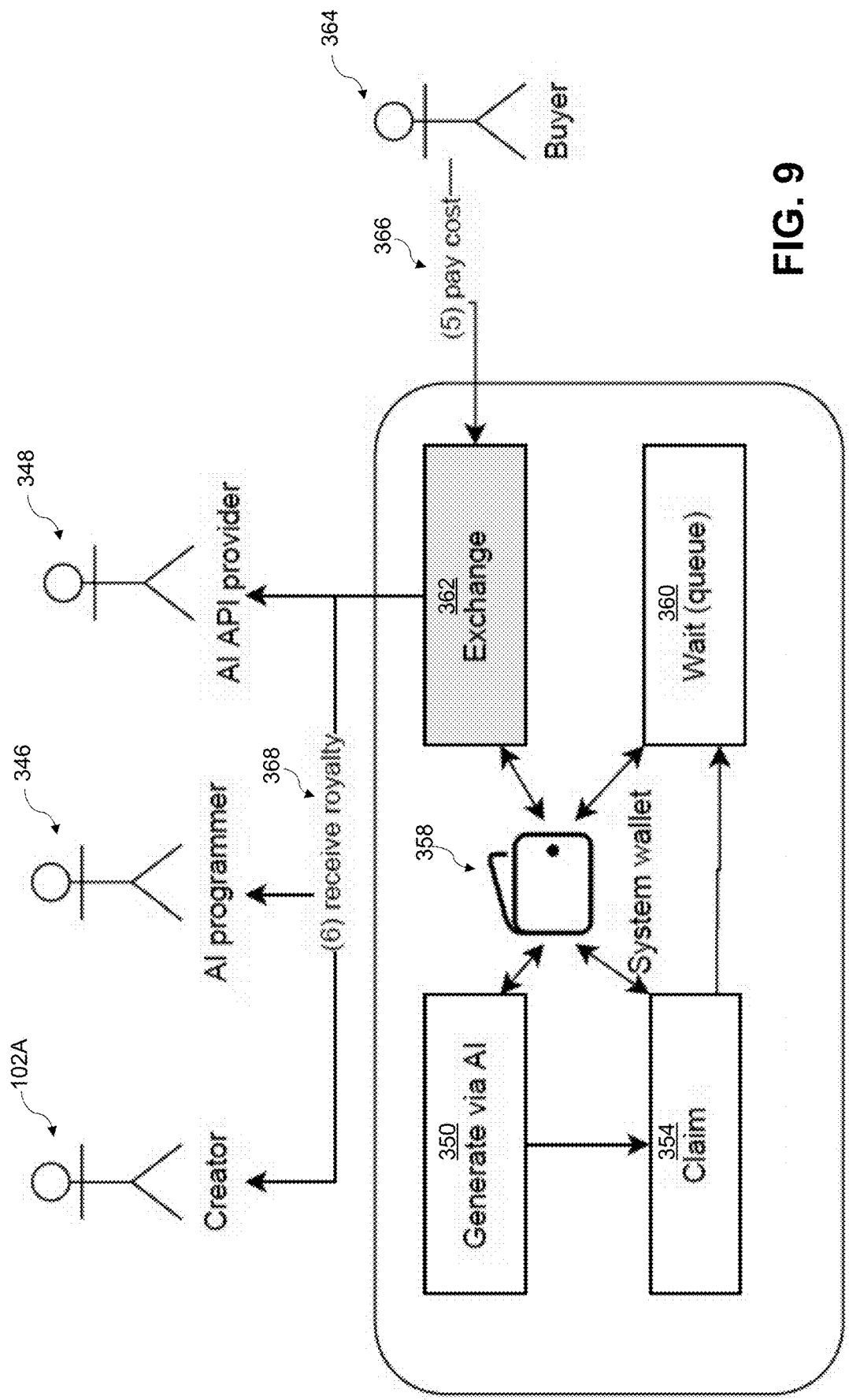
FIG. 9 depicts a schematic diagram of currency flow when exchanging AI-generated multimedia, according to at least some embodiments disclosed herein.

FIG. 8 depicts a schematic diagram showcasing currency flow when creating AI-generated multimedia, according to at least some embodiments disclosed herein. FIG. 9 depicts a schematic diagram of currency flow when exchanging AI-generated multimedia, according to at least some embodiments disclosed herein.

A creator (e.g., the first user 102A who uses service to generate the AI-generated multimedia) pays a fee at a process step 340 to generate the AI-generated multimedia at a process step 350. The creator also pays fees at a process step 352 to claim the copyright (at a process step 354) or pays a fee at a process step 356 to wait for a policy update (at a process step 360). Such information may be saved in a system wallet 358. The system wallet 358 allows for the balancing of fees/payments between the various parties.

Moreover, the AI programmer 346 and/or the AI API provider 348 may receive a royalty payment at a process step 342 and a process step 368. More specifically, each time the AI-generated multimedia is created, the AI programmer 346 and/or the AI API provider 348 receive a share of the fee (e.g., a royalty). The percentage can be set via the smart contract by the AI programmer 346 and/or the AI API provider 348. It should be appreciated that the information may be exchanged at a process step 362 with the buyer 364.

When the buyer 364 wants permission to use/access a copyright of a work (e.g., the AI-generated multimedia) for a limited-time (e.g., displaying or replaying), or if the AI-generated multimedia is transferred, the buyer 364 pays a cost 366, and the creator (e.g., the first user 102A), the AI programmer 346, and/or the AI API provider 348 receive royalty payments. Percentages of payment are defined between the involved parties. In some implementations, a split of the royalty percentages is even between the creator (e.g., the first user 102A), the AI programmer 346, and/or the AI API provider 348. In other examples, the split of the royalty percentages is even between the creator (e.g., the first user 102A), the AI programmer 346, and the AI API provider 348.

As an illustrative example, the AI programmer 346 may receive 50% of the royalty payment from the buyer 364, the AI API provider 348 may receive 30% from the royalty payment from the buyer 364, and the creator (e.g., the first user 102A) may receive 20% of the royalty payment from the buyer 364. A remainder of the royalty payment may be used to run the system. Additionally, in some implementations, the creator (e.g., the first user 102A) may check the royalty terms prior to selecting the AI model that is used to generate the AI-generated multimedia.

In some implementations of the system described herein, there is a possibility that the creator (e.g., the first user 102A who uses the AI to generate the AI-generated multimedia) wants or is required to edit the AI-generated multimedia. This can happen at several stages of the system: (1) after generating the AI-generated multimedia and/or (2) when claiming for the copyright for the AI-generated multimedia. The AI-generated multimedia may be edited in the following way: (1) hiding a secret message into the AI-generated multimedia or metadata or (2) setting a unique identification into the AI-generated multimedia. The edit to the AI-generated multimedia poses little or no change to an appearance of the AI-generated multimedia.

In other implementations of the system described herein, the creator (e.g., the first user 102A who uses the AI to generate the AI-generated multimedia) may name the AI-generated multimedia in any way the creator wishes (e.g., giving the AI-generated multimedia a title). This may happen (1) at the time the copyright is claimed for the AI-generated multimedia or (2) when browsing AI-generated multimedia and deciding to give each asset a title. In this second scenario, the creator pay an additional fee for updating information in the blockchain.

In further implementations of the system, one person can make an adaptation (e.g., make a modification or a change) by using the AI model or by manually processing the AI-generated multimedia to create a new AI-generated multimedia. The person may claim the copyright to the new AI-generated multimedia as long as it passes all copyright-related policies of the system described herein.

Figure 10:
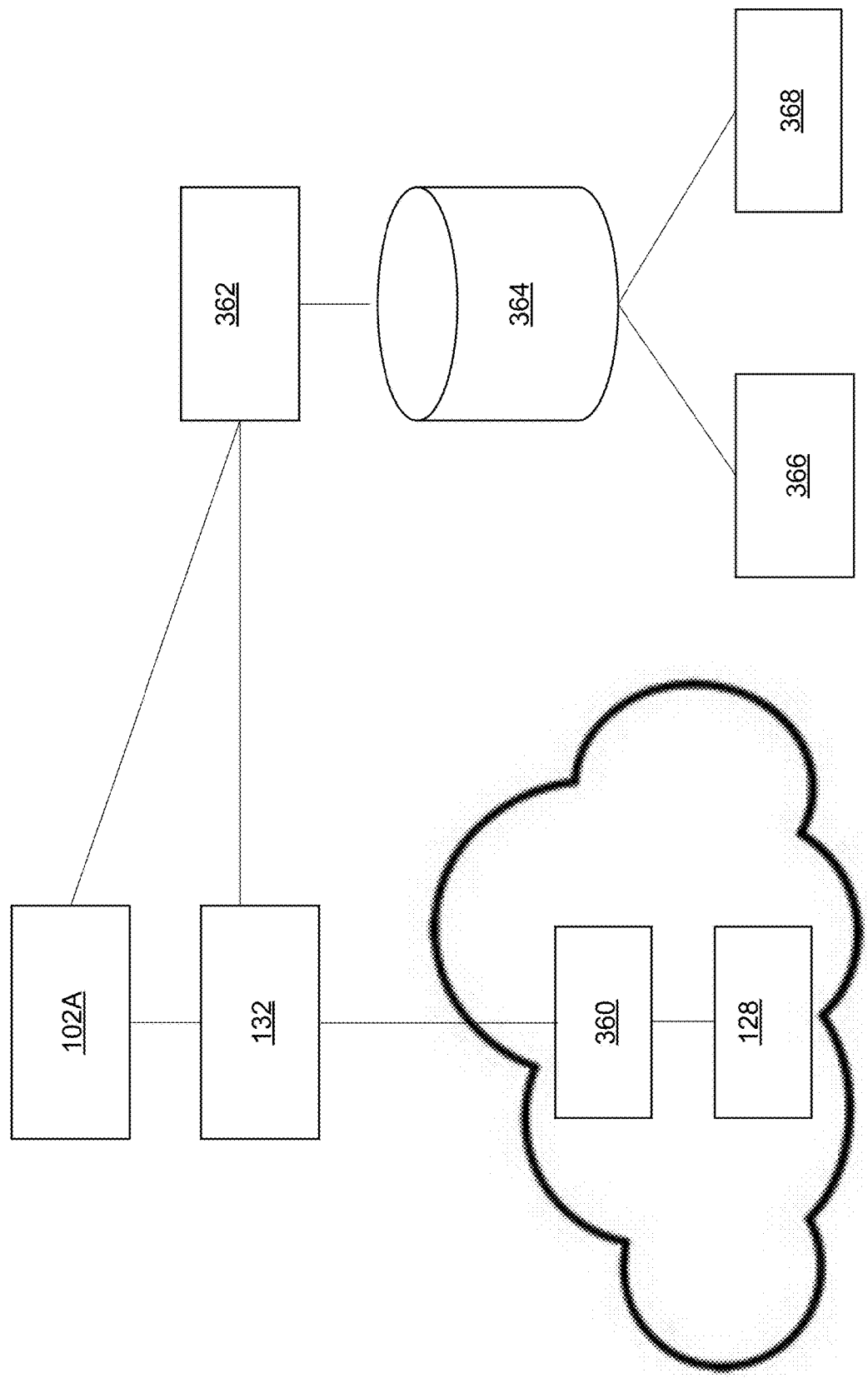
FIG. 10 depicts a block diagram depicting how a system provides an Appstore for applications, according to at least some embodiments disclosed herein.

FIG. 10 depicts a block diagram depicting how a system provides an Appstore for applications, according to at least some embodiments disclosed herein.

The system of FIG. 10 provides access to an Appstore for applications. Components of FIG. 10 include the first user 102A, the wallet applications 132, an Appstore 362, an app repository database 364, an app/update security service 366, an app compliance service 368, a ledger blockchain database 360, and/or one or more servers 128. The first user 102A can navigate the Appstore 362 to identify and download applications from the app repository database 364. These applications may include the wallet applications 132, for example.

Figure 11:
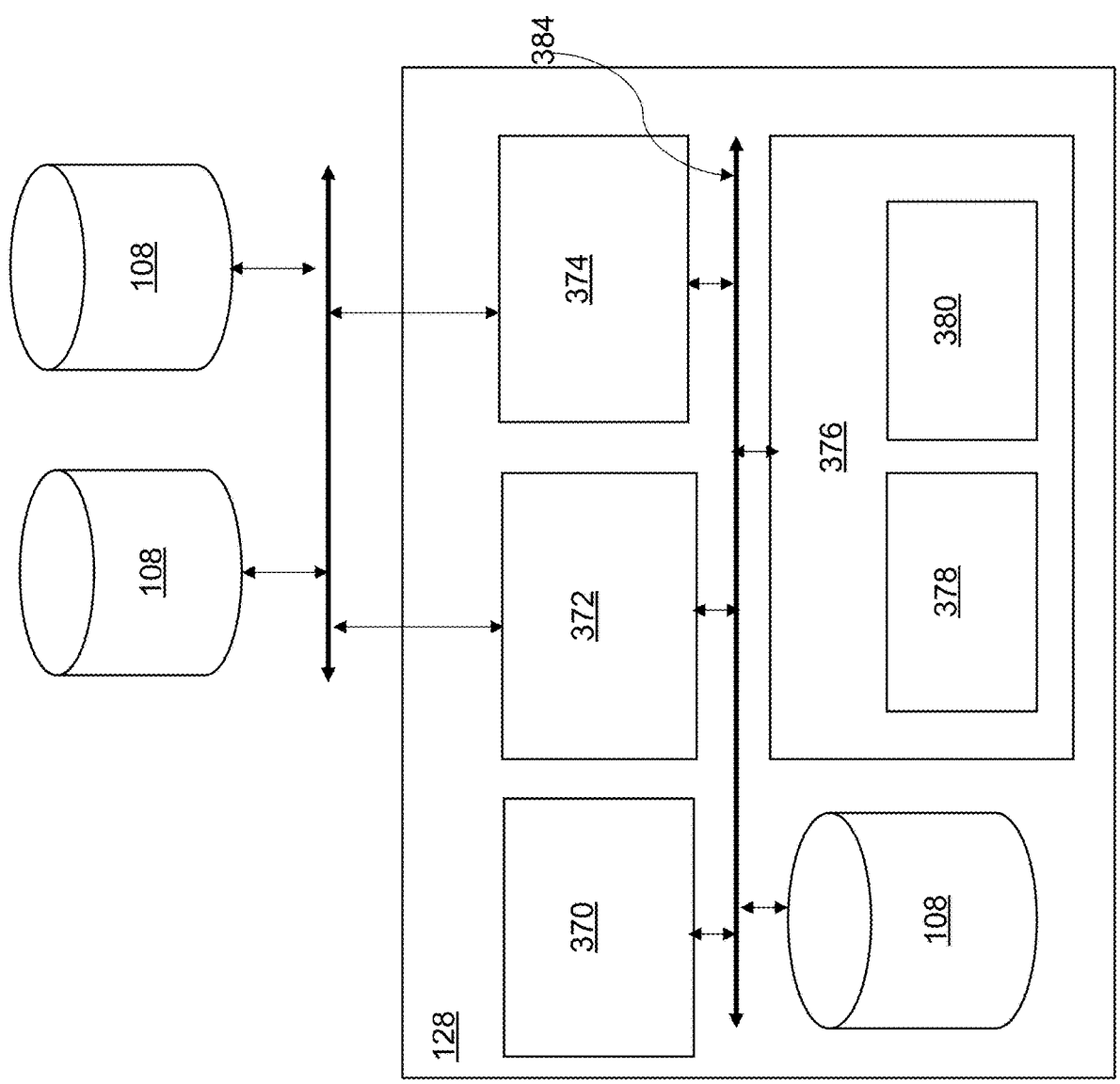
FIG. 11 depicts a block diagram of a server which may be used by a system, according to at least some embodiments disclosed herein.

FIG. 11 depicts a block diagram of a server which may be used by a system, according to at least some embodiments disclosed herein.

A block diagram of FIG. 11 illustrates a server 128. One or more servers 128 may be used in the system or may be standalone servers. The server 128 may be a digital computer that, in terms of hardware architecture, generally includes a processor 370, input/output (I/O) interfaces 372, a network interface 374, the datastore 108, and memory 376.

The components (108, 370, 372, 374, and 376) are communicatively coupled via a local interface 384. The local interface 384 may be, for example but not limited to, one or more buses or other wired or wireless connections. The local interface 384 may have additional elements, which are omitted for simplicity, such as controllers, buffers, drivers, repeaters, and receivers, etc., to enable communications. Further, the local interface 384 may include address, control, and/or data connections to enable communications among the aforementioned components.

The processor 370 is a hardware device for executing software instructions. The processor 370 may be any custom made or commercially available processor, a central processing unit (CPU), an auxiliary processor among several processors associated with the server 128, a semiconductor-based microprocessor, or generally any device for executing software instructions. When the server 128 is in operation, the processor 370 is configured to execute software stored within the memory 376, to communicate data to and from the memory 376, and to generally control operations of the server 128 pursuant to the software instructions.

The I/O interfaces 372 may be used to receive user input from and/or for providing system output to one or more devices or components. User input may be provided via, for example, a keyboard, touch pad, and/or a mouse. System output may be provided via a display device and a printer (not shown). The I/O interfaces 372 may include, for example, a serial port, a parallel port, a small computer system interface (SCSI), a serial ATA (SATA), a fiber channel, Infiniband, iSCSI, a PCI Express interface (PCI-x), an infrared (IR) interface, a radio frequency (RF) interface, and/or a universal serial bus (USB) interface.

The network interface 374 may be used to enable the server 128 to communicate on a network, such as the Internet, a wide area network (WAN), a local area network (LAN), etc. The network interface 374 may include an Ethernet card or adapter or a wireless local area network (WLAN) card or adapter. The network interface 374 may include address, control, and/or data connections to enable communications on the network.

The datastore 108 may be used to store data. The datastore 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the datastore 108 may incorporate electronic, magnetic, optical, and/or other types of storage media. In one example, the datastore 108 may be located internal to the server 128 such as, an internal hard drive connected to the local interface 384 in the server 128. In other examples, the datastore 108 may be located external to the server 128 such as, an external hard drive connected to the I/O interfaces 372 (e.g., SCSI or USB connection). In a further embodiment, the datastore 108 may be connected to the server 128 through a network, such as, a network attached file server.

The memory 376 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 376 may incorporate electronic, magnetic, optical, and/or other types of storage media. Note that the memory 376 may have a distributed architecture, where various components are situated remotely from one another, but can be accessed by the processor 370. The software in memory 376 may include one or more software programs, each of which includes an ordered listing of executable instructions for implementing logical functions.

The software in the memory 376 includes a suitable operating system (O/S) 378 and one or more programs 380. The operating system 378 controls the execution of other computer programs, such as the one or more programs 380, and provides scheduling, input-output control, file and data management, memory management, and communication control and related services. The one or more programs 380 may be configured to implement the various processes and methods described herein.

Figure 12:
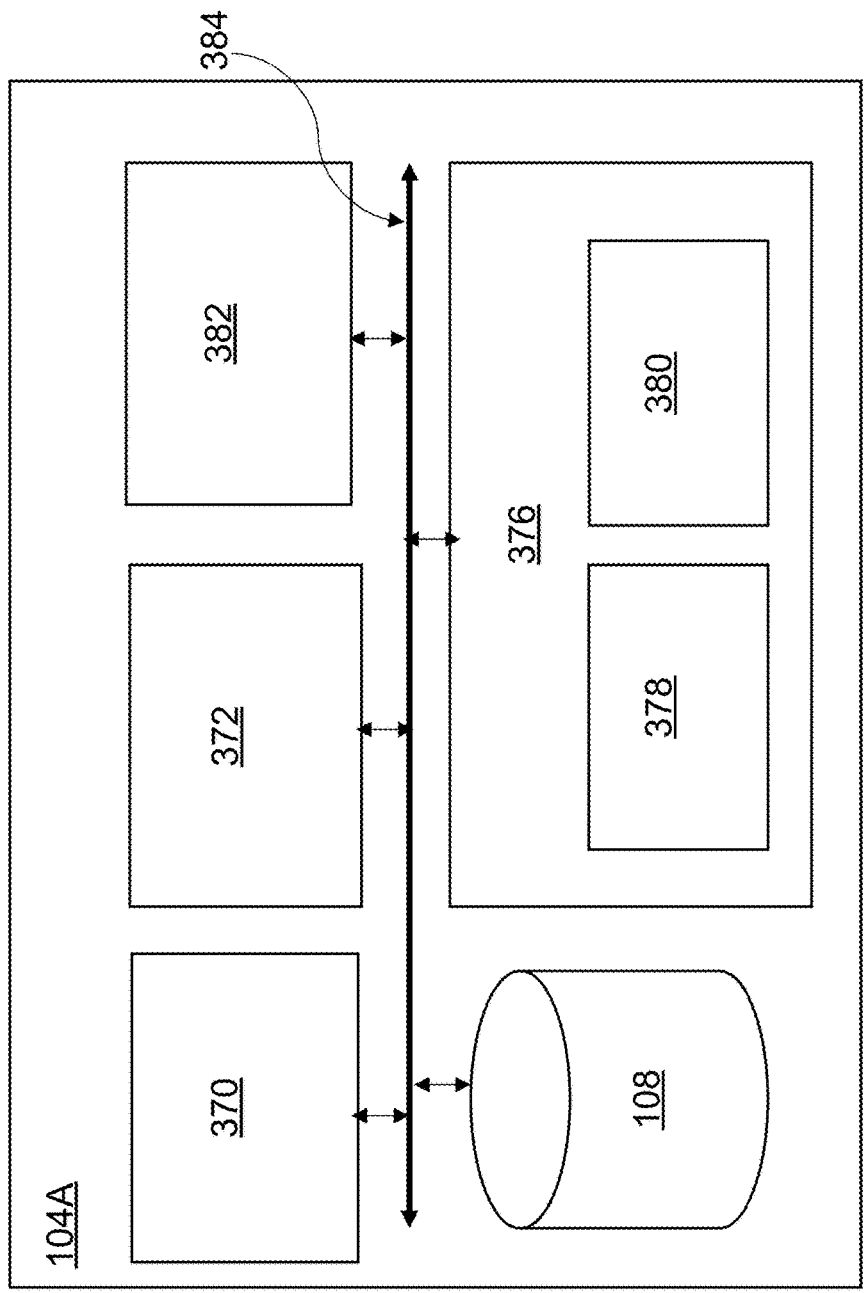
FIG. 12 depicts a block diagram of a client device which may be used by a system, according to at least some embodiments disclosed herein.

FIG. 12 depicts a block diagram of a client device which may be used by a system, according to at least some embodiments disclosed herein.

The block diagram of FIG. 12 illustrates the first client device 104A, which may be used in the system described herein. The first client device 104A may be a digital device that includes a processor 370, input/output (I/O) interfaces 372, a radio 382, the datastore 108, and memory 376. The components (370, 372, 382, 108, and 376) are communicatively coupled via a local interface 384. The local interface 384 can be one or more buses or other wired or wireless connections, as is known in the art. The local interface 384 can have additional elements, such as controllers, buffers, drivers, etc., to enable communications.

The processor 370 is a hardware device for executing software instructions. The processor 370 can be any custom-made or commercially available processor, the CPU, or an auxiliary processor associated with the first client device 104A, a semiconductor-based microprocessor, or any device for executing software instructions. When the first client device 104A is in operation, the processor 370 is configured to execute software stored within the memory 376, to communicate data to and from the memory 376, and to generally control operations of the first client device 104A based on the software instructions.

Moreover, the processor 370 may include a mobile optimized processor optimized for power consumption and mobile applications. The I/O interfaces 372 can be used to receive user input from and/or for providing system output. User input can be provided via, for example, a keypad, a touch screen, a scroll ball, a scroll bar, buttons, etc. System output can be provided via a display device such as a liquid crystal display (LCD), touch screen, etc. The I/O interfaces 372 can also include a serial port, a parallel port, a small computer system interface (SCSI), an infrared (IR) interface, a radio frequency (RF) interface, a universal serial bus (USB) interface, etc. Further, the I/O interfaces 372 can include a graphical user interface (GUI) that enables a user to interact with the first client device 104A. Additionally, the I/O interfaces 372 may further include an imaging device (such as a camera).

The radio 382 enables wireless communication to an external access device or network. Any number of suitable wireless data communication protocols, techniques, or methodologies can be supported by the radio 382, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G/5G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication.

The datastore 108 may be used to store data. The datastore 108 may include any of volatile memory elements, nonvolatile memory elements, and combinations thereof. Moreover, the datastore 108 may incorporate electronic, magnetic, optical, and/or other types of storage media. The memory 376 may include any of volatile memory elements, and/or nonvolatile memory elements. Further, the memory 376 may incorporate electronic, magnetic, optical, and/or other types of storage media. In some examples, the memory 376 may have a distributed architecture, where various components are situated remotely from one another, but can be accessed by the processor 370.

The software in the memory 376 can include one or more software programs, each of which includes an ordered listing of executable instructions for implementing functions. In the example of FIG. 12, the software in the memory 376 includes a suitable operating system (O/S) 378 and programs 380. The operating system 378 controls the execution of other computer programs. The programs 380 may include various applications configured to provide end user functionality with the first client device 104A. For example, the programs 380 may include: a web browser, social networking applications, streaming media applications, games, etc. In an example, an end user (e.g., the first user 102A) uses one or more of the programs 380 with a network to manipulate information of the system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

When introducing elements of the present disclosure or the embodiments thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A system comprising:
one or more processors;
one or more memories; and
one or more computer-readable hardware storage devices, the one or more computer-readable hardware storage devices containing program code executable by the one or more processors via the one or more memories to implement a method for creating and exchanging a copyright for each artificial intelligence (AI)-generated multimedia, the method comprising:
receiving, via a multimedia generation module, a user selection of an AI model for a multimedia, wherein the AI model comprises a first identifier associated with an AI programmer who coded the AI model and a second identifier associated with an AI API provider who made the AI model available for usage;
receiving, via the multimedia generation module, a reference input for the multimedia from the user;
in response to a determination that the reference input complies with system policies, generating, via the multimedia generation module, an AI-generated multimedia from the reference input using the AI model;
querying, via a copyright claiming module, the user as to whether the user wants to claim a copyright in the AI-generated multimedia;
receiving, via the copyright claiming module, an indication from the user that the user wants to claim the copyright in the AI-generated multimedia;
comparing, via the copyright claiming module, the AI-generated multimedia against works of a same type in a blockchain and decentralized file storage;
executing, via the copyright claiming module, a decentralized autonomous organization (DAO) manner to set up a verification policy that verifies an originality of the AI-generated multimedia, wherein the verification policy is based on at least two of the AI model, crowd voting, a human validator, and blind voting;
in response to a determination that the AI-generated multimedia fails to match the works of the same type in the blockchain and decentralized file storage, identifying, via the copyright claiming module, the AI-generated multimedia as having originality;
storing, via the one or more memories, the copyright for the AI-generated multimedia and the AI-generated multimedia in the blockchain and decentralized file storage accordingly;
receiving, via an asset exchanging module, a request from a buyer to use the copyright for the AI-generated multimedia;
prompting, via the asset exchanging module, the user to exchange the copyright for the AI-generated multimedia with the buyer for cryptocurrency or a payment, wherein the payment is split between the user, the AI programmer, and the AI API provider;
facilitating, via the asset exchanging module, the exchange between the user and the buyer; and
writing, via the asset exchanging module, the exchange to the blockchain.

2. The system of claim 1, wherein the cryptocurrency is selected from the group consisting of: a non-fungible token (NFT) and a cryptographic token.

3. The system of claim 1, wherein the system policies are rules associated with restricted content, child endangerment, inappropriate content, sexual content, profanity, hate speech, violence, terrorist, bullying, harassment, and/or dangerous products.

4. The system of claim 1, wherein the determination that the reference input complies with the system policies occurs automatically using the AI model.

5. The system of claim 1, wherein the determination that the reference input complies with the system policies occurs using human intervention.

6. The system of claim 1, wherein the method further comprises:
utilizing, via the copyright claiming module, additional information from the blockchain and decentralized file storage to verify the originality of the AI-generated multimedia.

7. The system of claim 6, wherein the method further comprises:
writing, via the copyright claiming module, the additional information to the blockchain.

8. The system of claim 1,
wherein the AI model is associated with a first identifier and a second identifier,
wherein the first identifier is associated with an AI programmer, and
wherein the second identifier is associated with an AI API provider.

9. The system of claim 1, wherein, in response to a determination that the AI-generated multimedia matches the works of the same type in the blockchain and decentralized file storage, the method further comprises:
identifying, via the copyright claiming module, the AI-generated multimedia as lacking the originality;
receiving, via the copyright claiming module, a notification from the user that the user wants to wait for a future update of a verification policy by queuing the AI-generated multimedia; and
storing, via the one or more memories, a pending copyright for the AI-generated multimedia in the blockchain and decentralized file storage.

10. The system of claim 1, wherein the method further comprises:
computing, via a legal component, a legal correctness for the reference input according to regulations and copyright laws.

11. A method executed by a system for creating and exchanging a copyright for each artificial intelligence (AI)-generated multimedia, the method comprising:
receiving, via a multimedia generation module of the system, a user selection of an AI model for a multimedia, wherein the AI model comprises a first identifier associated with an AI programmer who coded the AI model and a second identifier associated with an AI API provider who made the AI model available for usage;
receiving, via the multimedia generation module, a reference input for the multimedia from the user;
in response to a determination that the reference input complies with system policies, generating, via the multimedia generation module, an AI-generated multimedia from the reference input using the AI model;
querying, via a copyright claiming module of the system, the user as to whether the user wants to claim a copyright in the AI-generated multimedia;
receiving, via the copyright claiming module of the system, a notification from the user that the user wants to claim the copyright in the AI-generated multimedia;
comparing, via the copyright claiming module, the AI-generated multimedia against works of a same type in a blockchain and decentralized file storage;
executing, via the copyright claiming module, a decentralized autonomous organization (DAO) manner to set up a verification policy that verifies an originality of the AI-generated multimedia, wherein the verification policy is based on at least two of the AI model, crowd voting, a human validator, and blind voting;
in response to a determination that the AI-generated multimedia fails to match the works of the same type in the blockchain and decentralized file storage, identifying, via the copyright claiming module, the AI-generated multimedia as having originality;
storing, via the copyright claiming module, the copyright for the AI-generated multimedia and the AI-generated multimedia in the blockchain and decentralized file storage accordingly;
receiving, via an asset exchanging module of the system, a request from a buyer to use the copyright for the AI-generated multimedia;
prompting, via the asset exchanging module, the user to exchange the copyright for the AI-generated multimedia with the buyer for a payment, wherein the payment is split between the user, the AI programmer, and the AI API provider;
facilitating, via the asset exchanging module, the exchange between the user and the buyer; and
writing, via the asset exchanging module, the exchange to the blockchain.

12. The method of claim 11, further comprising:
utilizing, via the copyright claiming module, additional information from the blockchain and decentralized file storage to verify the originality of the AI-generated multimedia; and
writing, via the copyright claiming module, the additional information to the blockchain.

13. The method of claim 12, wherein, in response to a determination that the AI-generated multimedia matches the works of the same type in the blockchain and decentralized file storage, the method further comprises:
identifying, via the copyright claiming module, the AI-generated multimedia as lacking the originality;
receiving, via the copyright claiming module, a notification from the user that the user wants wait for a future update of a verification policy by queuing the AI-generated multimedia; and
storing, via the copyright claiming module, a pending copyright for the AI-generated multimedia in the blockchain and decentralized file storage.

14. The method of claim 12, wherein the payment is split evenly between the user, an AI programmer, and an AI API provider.

15. The method of claim 12, wherein the payment is split disproportionally between the user, an AI programmer, and an AI API provider.

16. The method of claim 12, further comprising:
utilizing a first smart contract for execution of the AI model; and
utilizing a second smart contract to verify the originality of the AI-generated multimedia.

17. The method of claim 11,
wherein the method is adapted to an editing platform, and
wherein if the platform is equipped with a monitoring AI model, an origin of the AI-generated multimedia is verifiable.

18. The system of claim 1, wherein, in response to a determination that the AI-generated multimedia matches the works of the same type in the blockchain and decentralized file storage, the method further comprises:
   identifying, via the copyright claiming module, the AI-generated multimedia as lacking the originality;
   receiving, via the copyright claiming module, a notification from the user that the user wants wait for a future update of a verification policy by queuing the AI-generated multimedia; and
   storing, via the one or more memories, a pending copyright for the AI-generated multimedia in the blockchain and decentralized file storage.

19. The system of claim 1, wherein the payment is split evenly between the user, an AI programmer, and an AI API provider.

20. The system of claim 1, wherein the payment is split disproportionally between the user, an AI programmer, and an AI API provider.

* * * * *